US012757198B2

(12) United States Patent
Yonezawa et al.

(10) Patent No.: US 12,757,198 B2
(45) Date of Patent: Oct. 6, 2026

(54) PROCESSING DEVICE, BASE STATION, COMMUNICATION SYSTEM, METHOD, AND STORAGE MEDIUM

(71) Applicant: KABUSHIKI KAISHA TOSHIBA, Tokyo (JP)

(72) Inventors: Yuki Yonezawa, Ayase Kanagawa (JP); Kentaro Taniguchi, Kawasaki Kanagawa (JP); Koji Akita, Yokohama Kanagawa (JP); Miyuki Ogura, Tachikawa Tokyo (JP); Tomoya Tandai, Ota Tokyo (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 451 days.

(21) Appl. No.: 18/458,205

(22) Filed: Aug. 30, 2023

(65) Prior Publication Data

US 2024/0236981 A1 Jul. 11, 2024

(30) Foreign Application Priority Data

Jan. 10, 2023 (JP) ................................ 2023-001747

(51) Int. Cl.
*H04W 72/1273* (2023.01)
*H04L 5/00* (2006.01)

(52) U.S. Cl.
CPC ....... *H04W 72/1273* (2013.01); *H04L 5/0048* (2013.01)

(58) Field of Classification Search
CPC ......................... H04W 72/1273; H04L 5/0048
See application file for complete search history.

(56) References Cited

U.S. PATENT DOCUMENTS

2010/0027595 A1 2/2010 Takada et al.
2010/0135233 A1* 6/2010 Ono ..................... H04W 72/52 370/329

(Continued)

FOREIGN PATENT DOCUMENTS

JP 2010035032 A 2/2010
JP WO2017170223 A1 10/2017

(Continued)

OTHER PUBLICATIONS

U.S. Appl. No. 18/177,656, First Named Inventor: Koji Akita; Title: "Electronic Apparatus, Base Station, Communication System, Method, and Storage Medium"; filed Mar. 2, 2023.

(Continued)

*Primary Examiner* — Rasheed Gidado
(74) *Attorney, Agent, or Firm* — Holtz, Holtz & Volek PC

(57) ABSTRACT

According to one embodiment, a processing device for a base station including a first layer and a second layer, includes a receiver unit configured to receive first data from the first layer, a processing unit configured to generate second data based on the first data, and a transmitter unit configured to transmit the second data to the second layer. The processing unit is configured to determine a transmission cycle of the first data based on a timing at which the first data is received and a plurality of transmission cycle candidates, and cause the transmitter unit to transmit the second data at a timing based on the transmission cycle of the first data.

25 Claims, 23 Drawing Sheets

(56) References Cited

U.S. PATENT DOCUMENTS

| | | | | |
|---|---|---|---|---|
| 2015/0271809 | A1* | 9/2015 | Kato | H04W 72/23<br>370/329 |
| 2017/0070429 | A1* | 3/2017 | Bae | H04L 12/413 |
| 2017/0078201 | A1* | 3/2017 | Takahashi | H04L 47/24 |
| 2019/0110224 | A1 | 4/2019 | Yasukawa et al. | |
| 2022/0232593 | A1* | 7/2022 | Fujishiro | H04W 72/1268 |
| 2023/0199769 | A1 | 6/2023 | Yonezawa et al. | |
| 2024/0313896 | A1* | 9/2024 | Zhang | H04L 1/1896 |
| 2024/0406295 | A1* | 12/2024 | Xu | H04L 5/14 |

FOREIGN PATENT DOCUMENTS

| | | | |
|---|---|---|---|
| JP | 2018133663 | A | 8/2018 |
| JP | 2023091725 | A | 6/2023 |
| WO | 2017170223 | A1 | 10/2017 |

OTHER PUBLICATIONS

Japanese Office Action (and an English language translation thereof) dated Nov. 25, 2025, issued in corresponding Japanese Application No. 2023-001747.

Kaltenberger, Florian, “OAI Layer 1/2 Procedures”, Eurecom Open Air Interface, Dec. 3, 2019.

* cited by examiner

[{interval:5, data_size:1500}, {interval:20, data_size:3000}}, ...]

[{interval:5, data_size:1500, mti:0x12AA}, {interval:20, data_size:3000, mti:0x12AA},
{interval:10, data_size:1500, mti:0x12AB}, {interval:10, data_size:1500, mti:0x12AB}, ...]

FIG. 10

PROCESSING DEVICE, BASE STATION, COMMUNICATION SYSTEM, METHOD, AND STORAGE MEDIUM

CROSS-REFERENCE TO RELATED APPLICATIONS

This application is based upon and claims the benefit of priority from Japanese Patent Application No. 2023-001747, filed Jan. 10, 2023, the entire contents of which are incorporated herein by reference.

FIELD

Embodiments described herein relate generally to a processing device, a base station, a communication system, a method, and a storage medium.

BACKGROUND

In radio communication between a terminal and a base station, the terminal performs procedures including detection of transmission data, transmission of a request for allocating communication resources to the base station, reception of allocation information from the base station, and transmission of data to the base station. Therefore, a communication delay is likely to occur during uplink communication from the terminal to the base station. In the uplink communication, it is desired to reduce a delay of communication.

BRIEF DESCRIPTION OF THE DRAWINGS

FIG. 10 is a diagram for explaining an example of scheduling information according to the second embodiment.

DETAILED DESCRIPTION

Figure 1:
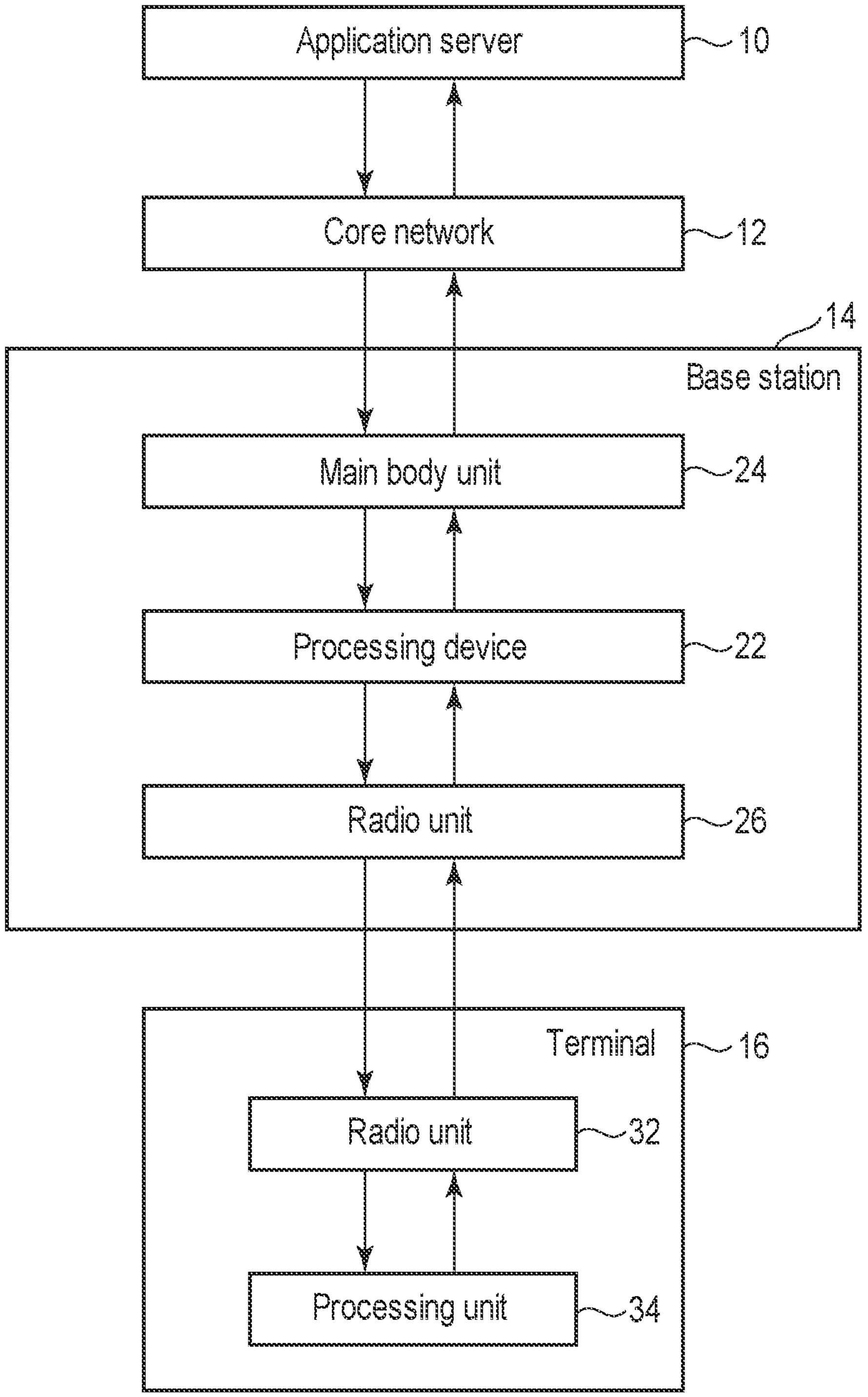
FIG. 1 is a diagram illustrating an example of a radio communication system according to first to eleventh embodiments.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes, and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, a processing device of a base station includes a first layer and a second layer. The first layer and the second layer have different communication function. The processing device includes a receiver unit that receives first data from the first layer, a processing unit that generates second data based on the first data, and a transmitter unit that transmits the second data to the second layer. The processing unit determines a transmission cycle of the first data based on a timing at which the first data is received and a plurality of transmission cycle candidates, and causes the transmitter unit to transmit the second data at a timing based on the transmission cycle of the first data. The transmission cycle of the first data is a cycle at which the first data is transmitted to the first layer.

FIG. 1 is a diagram illustrating an example of a radio communication system according to first to eleventh embodiments. The radio communication system includes an application server 10, a core network 12, a base station 14, and at least one radio communication terminal (hereinafter referred to as a terminal) 16. In the following description, the terminal 16 is referred to at least one radio communication terminal.

The terminal 16 executes an application in cooperation with the application server 10. The application server 10 may exist on a cloud or on a physical server. The terminal 16 wirelessly transmits data to the application server 10 via the base station 14 and the core network 12. The terminal 16 receives data from the application server 10 via the core network 12 and the base station 14. The terminal 16 and the base station 14 are wirelessly connected to each other. The base station 14 and the core network 12 constitute a defined network such as 4G or 5G. The base station 14 and the core network 12 may constitute a network defined after 5G.

The base station 14 is logically divided into two functional units, and a processing device 22 is connected between the two functional units. Examples of the two functional units include a main body unit 24 that is in charge of MAC layers and layers higher than the MAC layers and communicates with the core network 12, and a radio unit 26 that is in charge of PHY layers and layers lower than the PHY layers and communicates with the terminal 16. MAC layers and PHY layers have different communication function and different protocol each other.

The terminal 16 is logically divided into two functional units. Examples of the two functional units include a radio unit 32 that communicates with the base station 14 and a processing unit 34 that communicates with the radio unit 32 and executes an application. The processing unit 34 executes the application to process data input from the radio unit 32, and a sensor or an input unit (not illustrated), and generate data to be transmitted to the base station 14. The size and the generation cycle of the data generated by the processing unit 34 are determined by the application. For example, an application for controlling a robot periodically generates outputs of various sensors to be transmitted from the terminal 16 to the application server 10. It is assumed that the application server 10 periodically transmits a robot control signal according to a value of the sensor. Therefore, the terminal 16 transmits data having a predetermined size to the base station 14 at a predetermined cycle.

Figure 2:
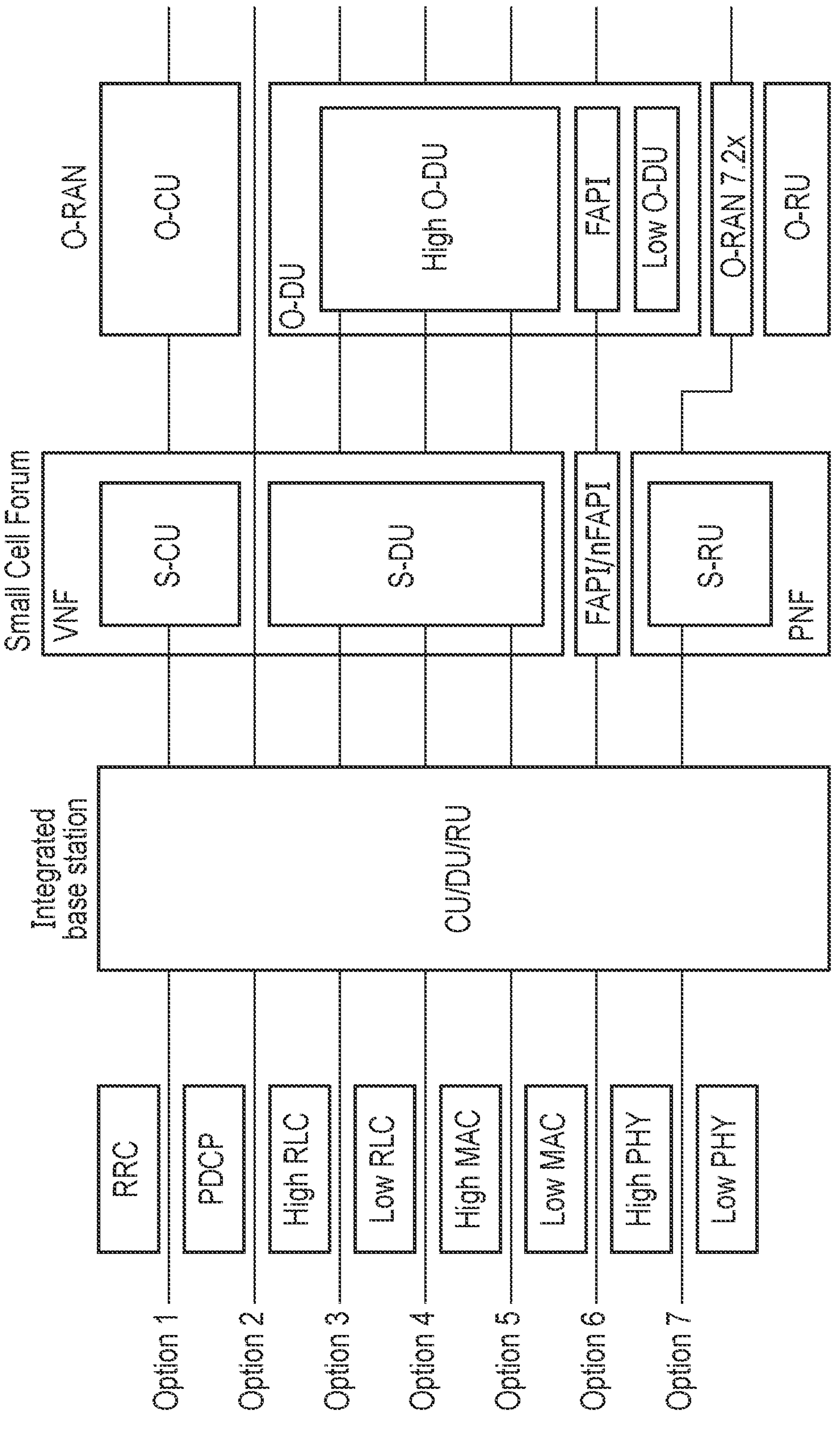
FIG. 2 is a diagram for explaining an example of functional units of a base station according to the first to eleventh embodiments.

FIG. 2 is a diagram for explaining an example of functional units of the base station 14 according to the first to eleventh embodiments. According to the definition of the third generation partnership project (3GPP) (registered trademark), which is an example of a mobile communication system, the base station includes eight layers including a radio resource control (RRC) layer, a packet data convergence protocol (PDCP) layer, a High radio link control (RLC) layer, a Low RLC layer, a High media access control (MAC) layer, a Low MAC layer, a High physical (PHY) layer, and a Low PHY layer. The interfaces, each being positioned between two adjacent layers, from the RRC layer to the Low PHY layer are defined as option 1 to option 7, respectively.

The High RLC and Low RLC may not be separate and may be implemented as one RLC layer. The High MAC and the Low MAC may not be separate and may be implemented as one MAC layer. The High PHY and the Low PHY may not be separate and may be implemented as one PHY layer.

The PHY layer (High PHY layer and Low PHY layer) corresponds to the radio unit 26. The RRC layer, the PDCP layer, the RLC layers (High RLC layer and Low RLC), and the MAC layers (High MAC and Low MAC) correspond to the main body unit 24. The processing device 22 is located in the option 6.

An integrated base station includes a central unit (CU), a distributed unit (DU), and a radio unit (RU). The RU corresponds to the radio unit 26. The DU and the CU correspond to the main body unit 24.

As an organization that defines a communication protocol between layers, there are a small cell forum and an open radio access network (O-RAN) alliance. The small cell forum and the O-RAN alliance have somewhat different layers corresponding to functions. In FIG. 2, RU, DU, and CU formulated by the small cell forum are described as S-RU, S-DU, and S-CU, respectively. RU, DU, and CU formulated by the O-RAN alliance are described as O-RU, O-DU, and O-CU, respectively.

In the small cell forum, the functions of the base station are divided into a virtual network function (VNF) and a physical network function (PNF). The VNF corresponds to the MAC layers and layers higher than the MAC layers. The PNF corresponds to the PHY layers and layers lower than the PHY layers. The interface between the VNF and the PNF is defined as option 6. The processing device 22 is located in the option 6. In the small cell forum, a communication protocol of option 6 is defined as a femto application platform interface (FAPI)/network functional application platform interface (nFAPI) protocol. The processing device 22 conforms to the FAPI/nFAPI protocol.

A device or software called VNF corresponds to the main body unit 24. A device or software called PNF corresponds to the radio unit 26. These two types of software may be operated on two different devices, or may be operated on the same device. The VNF includes an S-CU and an S-DU. The interface between the S-CU and the S-DU is defined as option 2. The PNF includes an S-RU.

The processing device 22 indirectly operates an upper or lower layer by inserting (or injecting) new data on the protocol while relaying data to be exchanged on the protocol. In an example of the FAPI/nFAPI interface protocol, the upper layer is the VNF and the lower layer is the PNF. The VNF and the PNF are connected to each other by socket communication. The VNF designates an IP address and a port number of the PNF. The PNF designates an IP address and a port number of the VNF.

The processing device 22 transmits data from the PNF to the VNF without any processing. Thus, the VNF can determine that it is connected to the PNF. The processing device 22 transmits data from the VNF to the PNF without any processing. Thus, the PNF can determine that it is connected to the VNF. Therefore, the VNF and the PNF recognize that they are connected to each other without recognizing the presence of the processing device 22, and operate as a system without any problem.

Note that, in the present specification, the transmission is not limited to the radio transmission and includes wired transmission or transfer. The reception is not limited to the radio reception and includes wired reception or transfer.

The processing device 22 inserts new data into received data of the normal protocol according to a rule defined by the protocol, for example, the order of packets. Thus, the upper layer and the lower layer do not determine that the new data is data inserted by a mediated layer (the processing device 22) and process the new data as data of the normal protocol.

A point at which the S-CU and the S-DU are separate is option 2. The S-CU corresponds to the RRC layer and the PDCP layer. The S-DU corresponds to the High RLC layer, the Low RLC layer, the High MAC layer, and the Low MAC layer.

The S-RU corresponds to the High PHY layer and the Low PHY layer.

The S-RU corresponds to the radio unit 26. The S-CU and the S-DU correspond to the main body unit 24. The processing device 22 conforms to the FAPI/nFAPI protocol.

In the O-RAN alliance, the functions of the base station are divided into an O-CU, an O-DU, and an O-RU.

The O-CU corresponds to the RRC layer and the PDCP layer. The O-DU corresponds to the High RLC layer, the Low RLC layer, the High MAC layer, the Low MAC layer, and the High PHY layer. The O-RU corresponds to the Low PHY layer.

The O-CU and the O-DU correspond to the main body unit 24. The interface between the O-CU and the O-DU is defined as option 2. The interface between the O-DU and the O-RU is defined as option 7. The processing device 22 is located in the option 7. In the O-RAN alliance, the communication protocol of the option 7 is defined as an O-RAN 7.2x protocol. The processing device 22 conforms to the O-RAN 7.2x protocol.

The O-DU is divided into a High O-DU and a Low O-DU. The High O-DU corresponds to the High RLC layer, the Low RLC layer, the High MAC layer, and the Low MAC layer.

The interface between the High O-DU and the Low O-DU is defined as option 6. In the O-RAN alliance, the communication protocol of the option 6 is defined as an FAPI protocol.

The O-RU corresponds to the radio unit 26.

First Embodiment

Figures 3, 4:
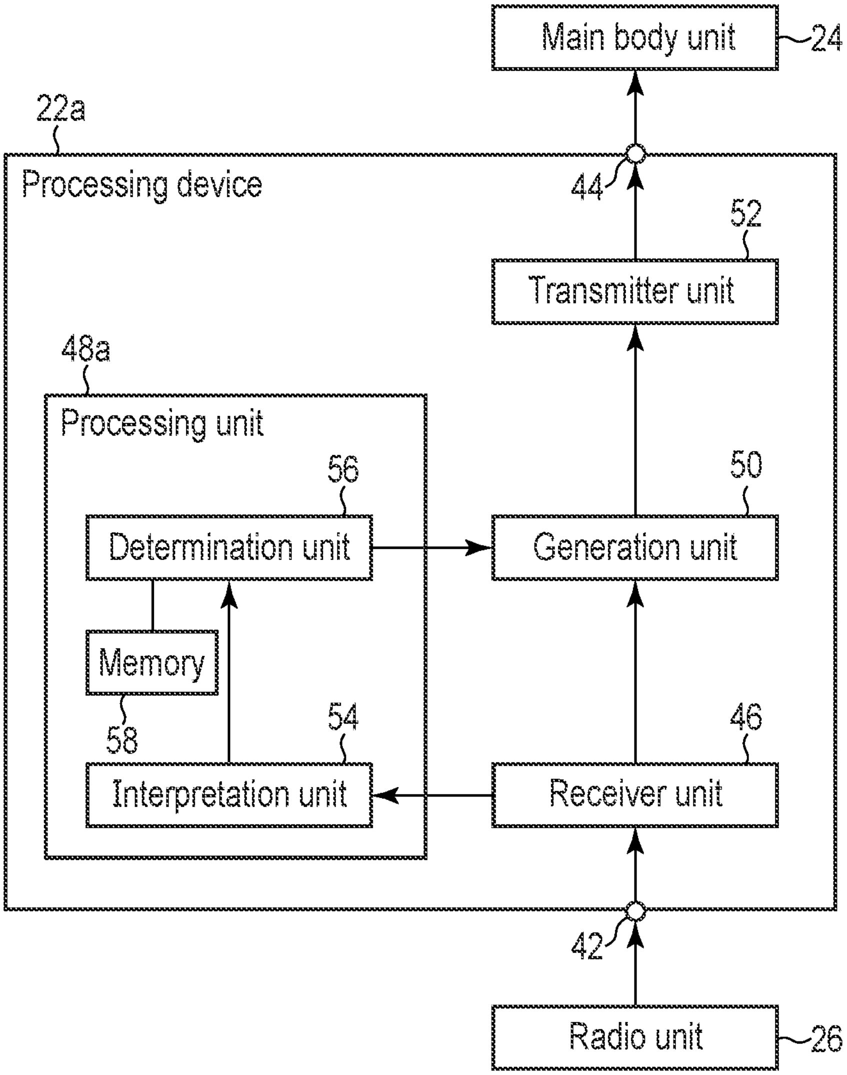
FIG. 3 is a block diagram for explaining an example of a processing device according to the first embodiment.
FIG. 4 is a diagram for illustrating an example of a parameter file according to the first embodiment.

FIG. 3 is a block diagram for explaining an example of a processing device 22*a* according to the first embodiment. The processing device 22*a* includes a port 42, a port 44, a receiver unit 46, a processing unit 48*a*, a generation unit 50, and a transmitter unit 52. The port 42 is connected to the radio unit 26. The port 44 is connected to the main body unit 24. The processing unit 48*a* includes an interpretation unit 54, a determination unit 56, and a memory 58.

The radio unit 26 transmits data from the terminal 16 to the receiver unit 46. The receiver unit 46 receives data from the radio unit 26, and transmits the received data to the generation unit 50 and the interpretation unit 54.

The processing unit 48*a* allocates communication resources in accordance with a timing at which the terminal 16 transmits user data. The interpretation unit 54 interprets the received data to detect MAC data. The MAC data includes user data to be transmitted to the main body unit 24 and control data for controlling the MAC layer. In the following description, the data refers to user data and control data. The control data includes a scheduling request to request allocation of communication resources. The interpretation unit 54 obtains the user data and the control data from the MAC data, and transmits the user data and the control data to the determination unit 56.

The processing unit 48*a* is one or more electronic circuits including a control device and an arithmetic device. The electronic circuit may be realized by an analog or digital circuit or the like. For example, a general-purpose processor, a central processing unit (CPU), a microprocessor, a digital signal processor (DSP), an ASIC (application specific IC), an FPGA (field programmable gate array), and a combination thereof are applicable. In addition, the processing unit 48*a* may be implemented by software or a program executed by these electronic circuits.

The determination unit 56 determines a transmission cycle of the terminal 16. The radio unit 26 transmits data from the terminal 16 to the receiver unit 46. The transmission cycle of the data is a cycle at which the data is transmitted to the radio unit 26. The memory 58 stores a parameter file. Examples of the memory 58 include a random access memory (RAM), a volatile memory (VM), and a non-volatile memory (NVM). As an example of the present embodiment, the memory 58 will be described as a DRAM.

The user of the base station 14 knows an application executed by the terminal 16 before starting the use of the base station 14, and also knows a period and a size of user data transmitted by the terminal 16. Before starting the use of the base station 14, the user of the base station 14 creates a parameter file and writes the parameter file into a non-volatile storage (not illustrated) in the base station 14. The parameter file describes a parameter indicating a cycle and a size of user data transmitted by the terminal 16 for each application. When the base station 14 is activated, the processing unit 48*a* reads the parameter file from the storage and writes the parameter file into the memory 58.

FIG. 4 is a diagram for illustrating an example of a parameter file stored in the base station 14 according to the first embodiment. FIG. 4 illustrates an example of a JSON format file. The terminal 16 according to the first embodiment can execute first and second applications. The parameter file in FIG. 4 includes a parameter indicating that user data generated by the first application is transmitted at a cycle of 5 ms and has a size of 1500 bytes, and that user data generated by the second application is transmitted at a cycle of 20 ms and has a size of 3000 bytes.

The determination unit 56 transmits information on the determined transmission cycle to the generation unit 50.

The generation unit 50 changes first data to be transmitted from the receiver unit 46 to the transmitter unit 52 to second data by inserting other data into the first data. Alternatively, the generation unit 50 changes first data to be transmitted from the receiver unit 46 to the transmitter unit 52 to second data by correcting some of the first data.

Figure 5:
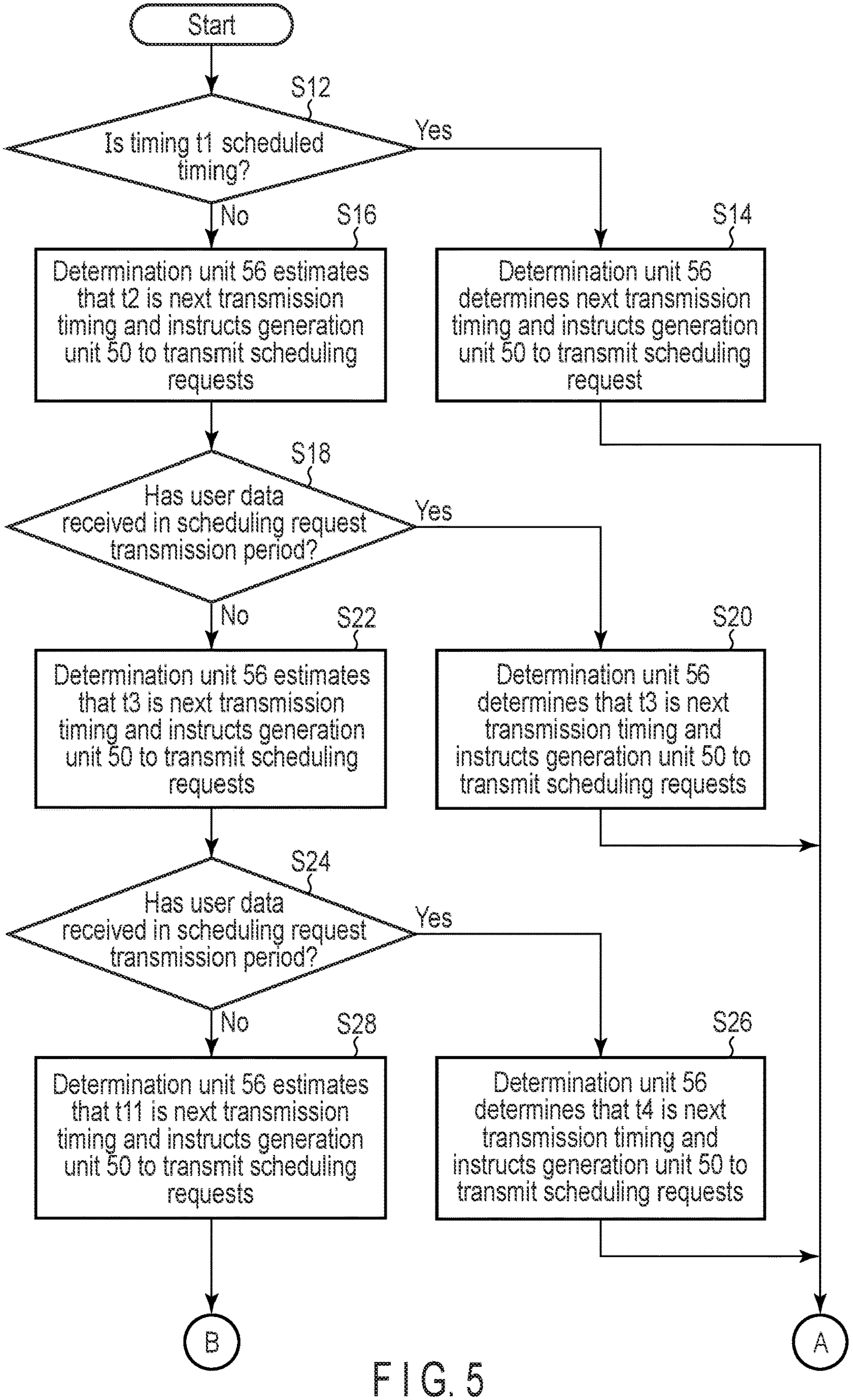
FIG. 5 is a flowchart for explaining a first half of an example of a delay reducing process according to the first embodiment.
Figure 6:
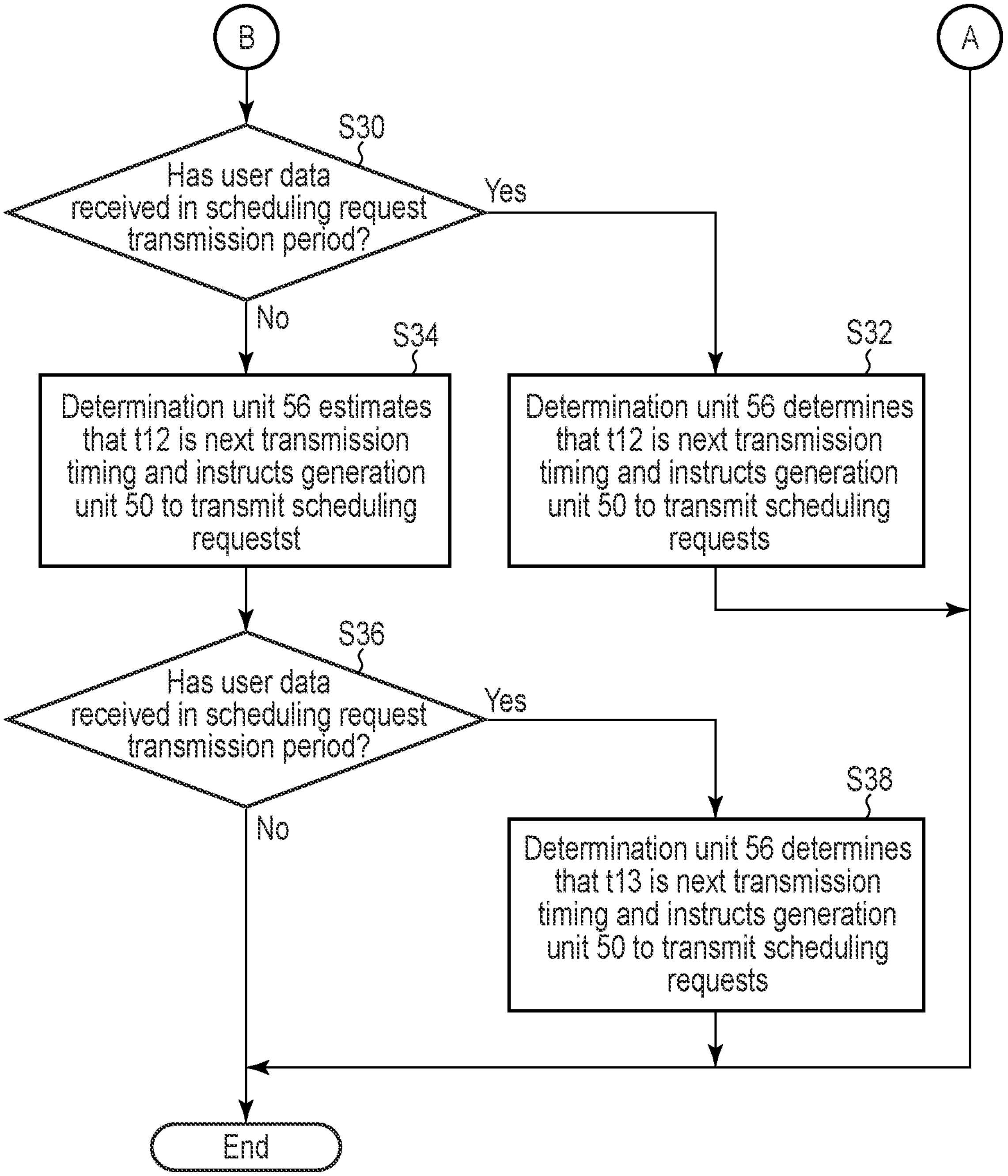
FIG. 6 is a flowchart for explaining a second half of the example of the delay reducing process according to the first embodiment.
Figure 7:
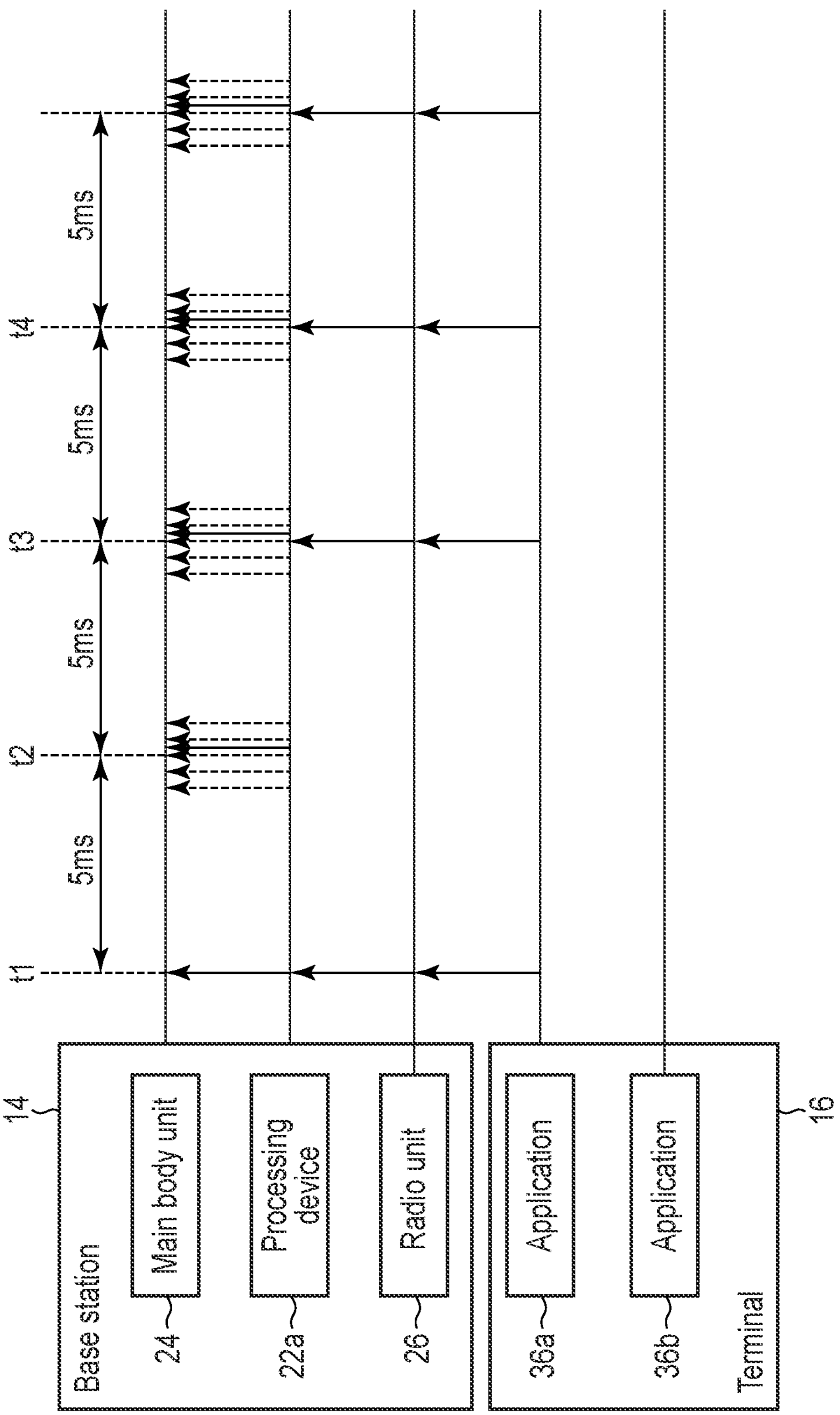
FIG. 7 is a timing chart for explaining a first example of the delay reducing process according to the first embodiment.
Figure 8:
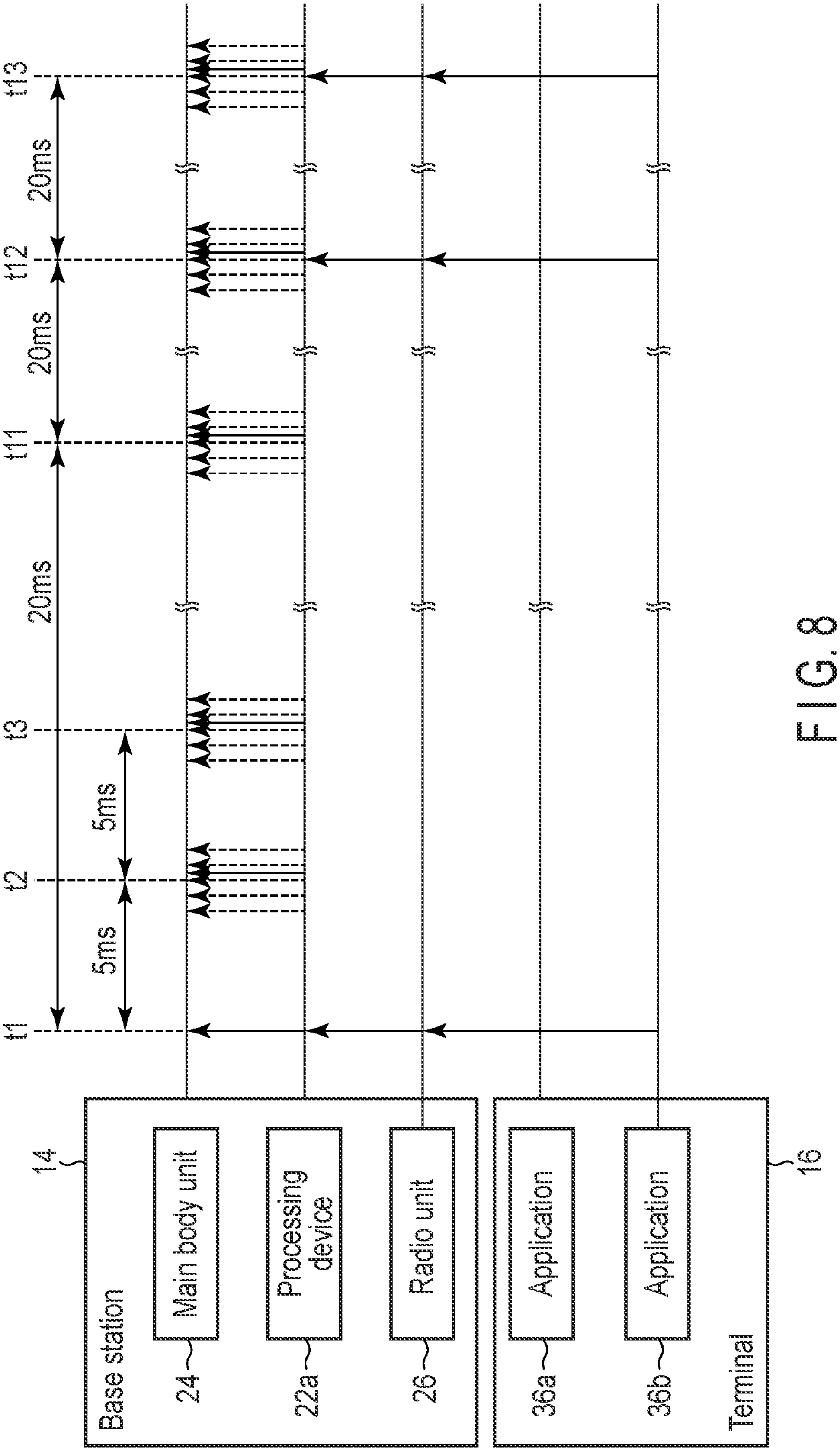
FIG. 8 is a timing chart for explaining a second example of the delay reducing process according to the first embodiment.

FIG. 5 is a flowchart for explaining a first half of an example of a delay reducing process of the base station 14 according to the first embodiment. FIG. 6 is a flowchart for explaining a second half of the example of the delay reducing process of the base station 14 according to the first embodiment. FIG. 7 is a timing chart for explaining a first example of the delay reducing process of the base station 14 according to the first embodiment. FIG. 8 is a timing chart for explaining a second example of the delay reducing process of the base station 14 according to the first embodiment.

The terminal 16 can execute an application 36*a* and an application 36*b*.

The terminal 16 transmits user data at a timing t1. FIG. 7 illustrates a timing chart in a case where the terminal 16 transmits at least some of the user data generated by the application 36*a* at the timing t1. FIG. 8 illustrates a timing chart in a case where the terminal 16 transmits at least some of the user data generated by the application 36*b* at the timing t1.

When detecting the reception of the user data from the terminal 16, the processing device 22*a* starts the delay reducing process.

The determination unit 56 determines whether the timing t1 is a scheduled timing at which user data is to be transmitted (step S12). The scheduled timing is a timing based on the transmission cycle of the terminal 16. In order to determine the scheduled timing, the determination unit 56 needs to know which parameter the user data is transmitted according to.

When the timing t1 is the scheduled timing (step S12; Yes), the determination unit 56 determines a next transmission timing at which the terminal 16 transmits user data next based on the parameter (transmission cycle) of the user data. The determination unit 56 instructs the generation unit 50 to transmit a scheduling request (also referred to as SR) to the transmitter unit 52 at the next transmission timing (step S14). The processing device 22*a* transmits the scheduling request to the main body unit 24.

The terminal 16 needs communication resources when transmitting the user data to the base station 14. Examples of the communication resources include frequency, time, space (spatial stream), power, code, orbital angular momentum, and the like. The scheduling request is a signal for the terminal 16 to request the base station 14 to allocate communication resources. In response to the scheduling request, an allocation unit in the base station 14 allocates communication resources to the terminal 16. The allocation unit is included in, for example, the MAC layer (the Low MAC layer or the High MAC layer) of the main body unit 24. The allocation unit transmits allocation information indicating the assigned communication resources to the terminal 16. The terminal 16 transmits user data to the base station 14 using the allocated communication resource.

The amount of communication resources that the allocation unit can allocate to the terminal 16 in response to the scheduling request is relatively small. For example, the allocation unit can allocate only communication resources of several hundred bytes for data communication in response to the scheduling request. When the size of the user data to be transmitted from the terminal 16 to the base station 14 is larger than the size allocated by the scheduling request, the terminal 16 also transmits a buffer status report (BSR) indicating an untransmitted data size at the time of transmitting the user data. The allocation unit allocates communication resources for the untransmitted user data in response to the BSR.

The timing at which the terminal 16 can transmit a scheduling request is a predetermined periodic timing. The base station 14 periodically transmits, to the terminal 16, a signal (not illustrated in FIGS. 7 and 8) indicating that transmission of scheduling request is permitted. The terminal 16 cannot transmit a scheduling request at a timing other than the predetermined timing. When there is user data to be transmitted, the terminal 16 stands by until the next predetermined timing to transmit the scheduling request. The stand-by for transmitting the scheduling request causes a delay in uplink communication.

The determination unit 56 according to the first embodiment predicts a next transmission timing. Instead of the terminal 16, the determination unit 56 instructs the generation unit 50 to transmit a scheduling request to the transmitter unit 52 before the next transmission timing so that allocation information is transmitted to the terminal 16 at the next transmission timing. The generation unit 50 generates the scheduling request, and inserts the scheduling request to data to be transmitted from the receiver unit 46 to the transmitter unit 52. The transmitter unit 52 transmits the data into which the scheduling request is inserted to the main body unit 24. As a result, since communication resources are allocated to the terminal 16 when there is user data to be transmitted to the base station 14 in the terminal 16, the user data can be immediately transmitted to the base station 14, thereby reducing a delay in uplink communication.

The timing at which the application generates user data may change. Even in this case, in order to generate user data to be transmitted to the base station 14 in the terminal 16 before communication resources are allocated to the terminal 16, in step S14, the determination unit 56 may instruct the generation unit 50 to transmit a predetermined number of (a plurality of) scheduling requests to the transmitter unit 52 in a predetermined period around a next transmission timing.

FIGS. 7 and 8 illustrate examples in which the timing t1 is not the scheduled timing at which user data is to be transmitted.

When the timing t1 is not the scheduled timing (step S12; No), the determination unit 56 estimates a next transmission timing based on the parameter file stored in the memory 58. As illustrated in FIG. 4, the parameter file indicates two types of cycles including 5 ms and 20 ms. The determination unit 56 assumes that 5 ms, which is the shorter one of the two types of cycles, is a cycle at which this user data is transmitted. The determination unit 56 estimates that timing t2, which is 5 ms after the timing t1, is a next transmission timing. The determination unit 56 instructs the generation unit 50 to transmit a predetermined number of (a plurality of) scheduling requests to the transmitter unit 52 at equal intervals in a predetermined period around the timing t2 (step S16). An example of the predetermined period is 0.4 ms, an example of the predetermined number is 5, and an example of the equal interval is 0.1 ms.

When it can be assumed that the timing at which the application generates user data does not change, the determination unit 56 may instruct the generation unit 50 to transmit one scheduling request to the transmitter unit 52 at the timing t2.

In response to the instruction from the determination unit 56, the generation unit 50 generates scheduling requests and transmits the scheduling requests to the transmitter unit 52.

The processing device 22*a* transmits five scheduling requests to the main body unit 24 at intervals of 0.1 ms in a period of 0.4 ms from 0.2 ms before the timing t2 to 0.2 ms after the timing t2.

In response to the scheduling requests, the allocation unit in the main body unit 24 allocates communication resources for uplink communication to the terminal 16. The allocation unit transmits the allocation information (not illustrated in FIGS. 7 and 8) to the terminal 16. When there is user data to be transmitted to the base station 14 in the terminal 16, the terminal 16 transmits the user data to the base station 14 using the communication resources based on the allocation information.

The determination unit 56 determines whether the terminal 16 has transmitted user data, that is, whether the determination unit 56 has received user data from the interpretation unit 54, in a period of 0.4 ms (a scheduling request transmission period) around the timing t2 (step S18). Specifically, in step S18, the determination unit 56 determines whether user data is received at the time when each of the five scheduling requests is transmitted in the period of 0.4 ms around the timing t2.

When two user data have not been received at two times when two consecutive scheduling requests are transmitted, the determination unit 56 determines that user data has not been received (step S18; No). When user data are not received at times when at least a certain number of (e.g., two) scheduling requests are transmitted among the 5 scheduling requests, the determination unit 56 determines that user data has not been received (step S18; No). Otherwise, the determination unit 56 determines that user data has been received (step S18; Yes).

When it is determined that user data has been received (step S18; Yes), the determination unit 56 determines that the transmission cycle is 5 ms, and determines that timing t3, which is 5 ms after the timing t2, is a next transmission timing.

The determination unit 56 instructs the generation unit 50 to transmit a predetermined number of scheduling requests to the transmitter unit 52 at predetermined intervals in a predetermined period around the timing t3 (step S20).

The processing device 22*a* transmits five scheduling requests to the main body unit 24 at intervals of 0.1 ms in a period of 0.4 ms from 0.2 ms before the timing t3 to 0.2 ms after the timing t3.

In response to the scheduling requests, the allocation unit in the main body unit 24 allocates communication resources for uplink communication to the terminal 16, and transmits the allocation information to the terminal 16. When there is user data to be transmitted to the base station 14 in the terminal 16, the terminal 16 transmits the user data to the base station 14 using the communication resources based on the allocation information.

When it is determined that the terminal 16 has not received user data at the timing t2 (step S18; No), the determination unit 56 determines whether user data has been received once more, not to determine whether user data has been received only based on one-time determination.

The determination unit 56 estimates that the timing t3 is a next transmission timing. The determination unit 56 instructs the generation unit 50 to transmit a predetermined number of scheduling requests to the transmitter unit 52 in a predetermined period around the timing t3 (step S22).

The processing device 22*a* transmits five scheduling requests to the main body unit 24 at intervals of 0.1 ms in a period of 0.4 ms from 0.2 ms before the timing t3 to 0.2 ms after the timing t3.

In response to the scheduling requests, the allocation unit in the main body unit 24 allocates communication resources for uplink communication to the terminal 16, and transmits the allocation information to the terminal 16. At this time, when there is user data to be transmitted to the base station 14 in the terminal 16, the terminal 16 transmits the user data to the base station 14 using the communication resources based on the allocation information.

The determination unit 56 determines whether the terminal 16 has transmitted user data, that is, whether the terminal 16 has received user data from the interpretation unit 54, in a predetermined period (a scheduling request transmission period) around the timing t3 (step S24). The determination in step S24 is performed in the same manner as the determination in step S18.

When it is determined that the terminal 16 has received user data at the timing t3 (step S24; Yes), the determination unit 56 determines that the transmission cycle is 5 ms, and determines that timing t4, which is 5 ms after the timing t3, is a next transmission timing.

The determination unit 56 instructs the generation unit 50 to transmit a predetermined number of scheduling requests to the transmitter unit 52 at predetermined intervals in a predetermined period around the timing t4 (step S26). Since the determination unit 56 determines the data transmission cycle, it is possible to predict the timing of receiving the next data. Therefore, the predetermined period around the timing t4 may be shorter than the predetermined period around the timing t3.

The processing device 22*a* transmits five scheduling requests to the main body unit 24 at intervals of 0.1 ms in a period of 0.4 ms from 0.2 ms before the timing t4 to 0.2 ms after the timing t4.

In response to the scheduling requests, the allocation unit in the main body unit 24 allocates communication resources for uplink communication to the terminal 16, and transmits the allocation information to the terminal 16. At this time, when there is user data to be transmitted to the base station 14 in the terminal 16, the terminal 16 transmits the user data to the base station 14 using the communication resources based on the allocation information.

FIG. 7 corresponds to a series of processing of steps S12 (in case of Yes), S16, S18, S22, S24 (in case of Yes), and S26 of FIG. 5.

When it is determined that the terminal 16 has not received user data at the timing t3 (step S24; No), the determination unit 56 assumes that 20 ms is a cycle at which this user data is transmitted, and estimates that timing t11, which is 20 ms after the timing t3, is a next transmission timing.

The determination unit 56 instructs the generation unit 50 to transmit a predetermined number of scheduling requests to the transmitter unit 52 in a predetermined period around the timing t11 (step S28).

The processing device 22*a* transmits five scheduling requests to the main body unit 24 at intervals of 0.1 ms in a period of 0.4 ms from 0.2 ms before the timing t11 to 0.2 ms after the timing t11.

In response to the scheduling requests, the allocation unit in the main body unit 24 allocates communication resources for uplink communication to the terminal 16, and transmits the allocation information to the terminal 16. At this time, when there is user data to be transmitted to the base station 14 in the terminal 16, the terminal 16 transmits the user data to the base station 14 using the communication resources based on the allocation information.

The determination unit 56 determines whether the terminal 16 has transmitted user data, that is, whether the terminal 16 has received user data from the interpretation unit 54, in the predetermined period (scheduling request transmission period) around the timing t11 (step S30). The determination in step S30 is performed in the same manner as the determination in step S18.

When it is determined that user data has been received (step S30; Yes), the determination unit 56 determines that the transmission cycle is 20 ms, and determines that timing t12, which is 20 ms after the timing t11, is a next transmission timing.

The determination unit 56 instructs the generation unit 50 to transmit a predetermined number of scheduling requests to the transmitter unit 52 at predetermined intervals in a predetermined period around the timing t12 (step S32).

The processing device 22*a* transmits five scheduling requests to the main body unit 24 at intervals of 0.1 ms in a period of 0.4 ms from 0.2 ms before the timing t12 to 0.2 ms after the timing t12.

In response to the scheduling requests, the allocation unit of the main body unit 24 allocates communication resources for uplink communication to the terminal 16, and transmits the allocation information to the terminal 16. At this time, when there is user data to be transmitted to the base station 14 in the terminal 16, the terminal 16 transmits the user data to the base station 14 using the communication resources based on the allocation information.

When it is determined that user data has not been received at the timing t11 (step S30; No), the determination unit 56 estimates that the timing t12 is a next transmission timing. The determination unit 56 instructs the generation unit 50 to transmit a predetermined number of scheduling requests to the transmitter unit 52 in a predetermined period around the timing t12 (step S34).

The processing device 22*a* transmits five scheduling requests to the main body unit 24 at intervals of 0.1 ms in a period of 0.4 ms from 0.2 ms before the timing t3 to 0.2 ms after the timing t3.

In response to the scheduling requests, the allocation unit in the main body unit 24 allocates communication resources for uplink communication to the terminal 16, and transmits the allocation information to the terminal 16. At this time, when there is user data to be transmitted to the base station 14 in the terminal 16, the terminal 16 transmits the user data to the base station 14 using the communication resources based on the allocation information.

The determination unit 56 determines whether the terminal 16 has transmitted user data, that is, whether the determination unit 56 has received user data from the interpretation unit 54, in the predetermined period (scheduling request transmission period) around the timing t12 (step S36). The determination in step S36 is performed in the same manner as the determination in step S18.

When it is determined that user data has been received at the timing t12 (step S36; Yes), the determination unit 56 determines that timing t13, which is 20 ms after the timing t12, is a next transmission timing.

The determination unit 56 instructs the generation unit 50 to transmit a predetermined number of scheduling requests to the transmitter unit 52 at predetermined intervals in a predetermined period around the timing t13 (step S38).

In response to the instruction from the determination unit 56, the generation unit 50 generates five scheduling requests and transmits the five scheduling requests to the transmitter unit 52.

The processing device 22*a* transmits five scheduling requests to the main body unit 24 at intervals of 0.1 ms in a period of 0.4 ms from 0.2 ms before the timing t4 to 0.2 ms after the timing t4.

In response to the scheduling requests, the allocation unit in the main body unit 24 allocates communication resources for uplink communication to the terminal 16, and transmits the allocation information to the terminal 16. When there is user data to be transmitted to the base station 14 in the terminal 16, the terminal 16 transmits the user data to the base station 14 using the communication resources based on the allocation information.

FIG. 8 corresponds to a series of processing of steps S12 (in case of Yes), S16, S18 (in case of No), S22, S24 (in case of No), S28, S30 (in case of No), S33, S36 (in case of Yes), and S38 of FIG. 5 and FIG. 6.

When it is determined that user data has not been received at the timing t13 (step S36; No), the delay reducing process ends.

Whenever the base station 14 receives user data from the terminal 16, the base station 14 executes the delay reducing process illustrated in FIGS. 5 and 6. Therefore, even when each of a plurality of terminals 16 executes a plurality of applications and transmits user data at each of a plurality of cycles to the base station 14, the base station 14 can determine a next transmission timing of the terminal 16. Since the allocation information is transmitted to the terminal 16 at the next transmission timing, a delay is unlikely to occur in the uplink communication.

Since the processing device 22*a* transmits a plurality of scheduling requests to the main body unit 24 in a predetermined period around the next transmission timing, even if the user data generation timing changes depending on the application, the allocation of the communication resources and the generation of the user data of the terminal 16 are synchronized.

Although FIGS. 5 and 6 illustrate an example in which the allocation of communication resources is requested according to a scheduling request, the processing device 22*a* can request the main body unit 24 to allocate communication resources using another method. The processing device 22*a* may request the main body unit 24 to allocate communication resources through an instruction to update BSR.

For example, in a case where large-size user data is to be transmitted, the processing device 22*a* requests allocation of communication resources for a first time of transmission of user data through a scheduling request. The processing device 22*a* requests allocation of communication resources for a second or subsequent time of transmission of user data through BSR. That is, the processing device 22*a* continuously updates BSR to be transmitted together with user data for uplink communication generated according to a scheduling request. As a result, the main body unit 24 continuously allocates communication resources for uplink communication according to BSR. By continuously rewriting BSR, it is possible to allocate a large amount of communication resources to the terminal 16, thereby making it possible to transmit data according to the size of the user data, resulting in a reduction in delay of uplink communication.

The transmitter unit 52 transmits data to the main body unit 24. When the processing device 22*a* transmits data according to the FAPI/nFAPI protocol formulated by the small cell forum, the transmitter unit 52 transmits and receives data according to a server-client model. The FAPI protocol and the nFAPI protocol are different in communication path. The FAPI protocol uses memory sharing for the communication path. The nFAPI protocol uses a network for the communication path. For example, in a case where the radio unit 26 is a client and the main body unit 24 is a server, the receiver unit 46 functions as a server, and the transmitter unit 52 functions as a client.

The processing device 22*a* according to the first embodiment determines a user data transmission cycle of the terminal 16, and transmits a scheduling request to the main body unit 24 instead of the terminal 16. As a result, the generation of user data by the terminal 16 and the allocation of communication resource to the terminal 16 are synchronized. A delay in uplink communication is prevented.

Furthermore, the processing device 22*a* according to the first embodiment conforms to a communication protocol between layers defined in the base station 14. The processing device 22*a* newly inserts a scheduling request onto the communication protocol or corrects a scheduling request on the communication protocol to BSR. Therefore, it is unnecessary to change the inside of the layer of the base station 14 or the function of the terminal 16.

Second Embodiment

Figure 9:
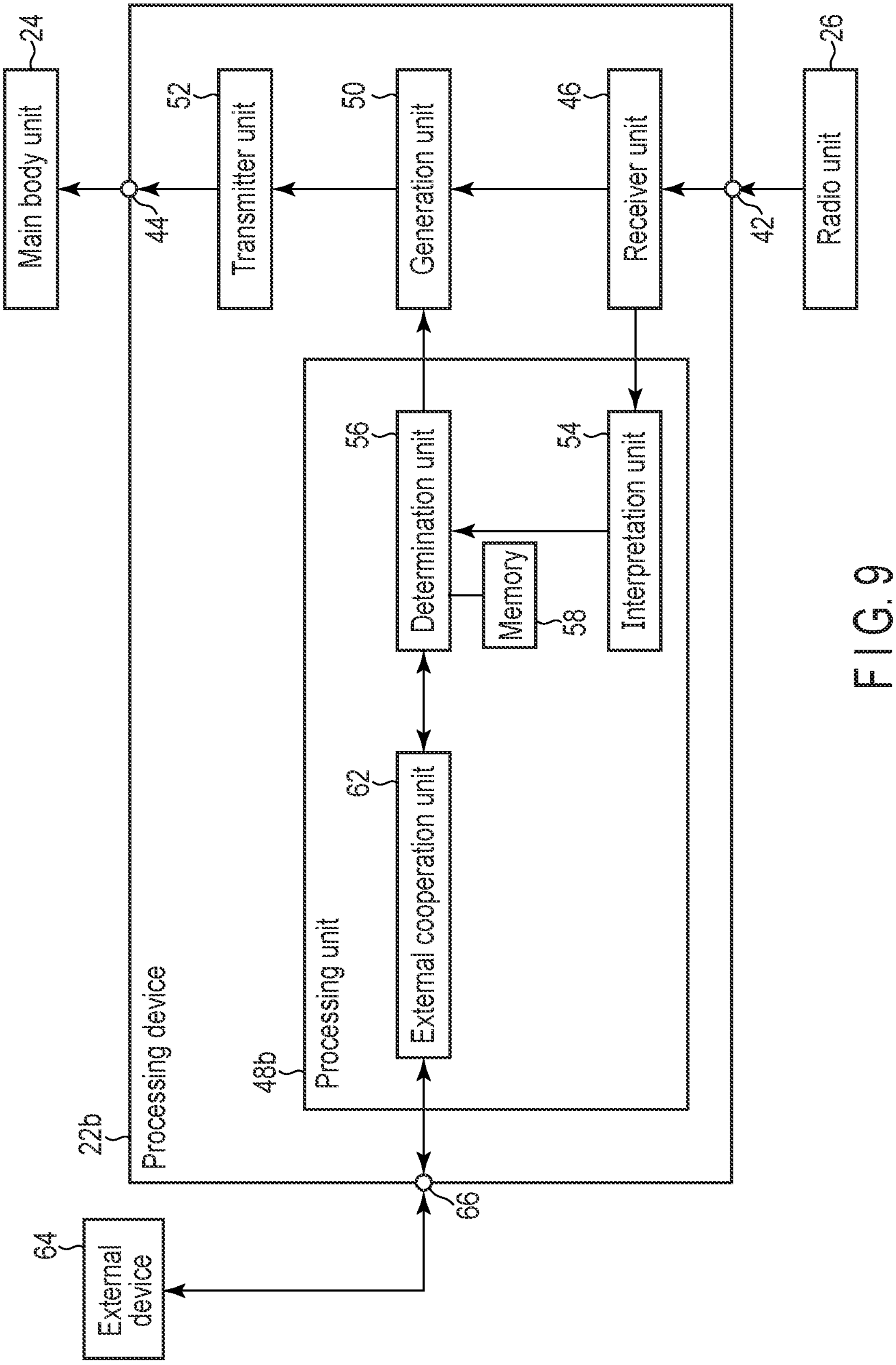
FIG. 9 is a block diagram for explaining an example of a processing device according to a second embodiment.

FIG. 9 is a block diagram for explaining an example of a processing device 22*b* according to a second embodiment. A processing unit 48*b* included in the processing device 22*b* further includes an external cooperation unit 62 as compared with the processing unit 48*a* according to the first embodiment illustrated in FIG. 3. The processing device 22*b* further includes a port 66 for connecting the external cooperation unit 62 to an external device 64 as compared with the processing device 22*a* according to the first embodiment illustrated in FIG. 3. The external device 64 is a multi-access edge computing (MEC), a cloud, or the like in which an application operates. The external cooperation unit 62 communicates with the external device 64. The external cooperation unit 62 receives a parameter file as illustrated in FIG. 4 from the external device 64. When an application to executed by the terminal 16 is added or an application executed by the terminal 16 is deleted, the external device 64 updates the parameter file accordingly, and transmits the updated parameter file to the external cooperation unit 62. The external cooperation unit 62 transmits the received parameter file to the determination unit 56. The determination unit 56 writes the received parameter file into the memory 58. As a result, even when a transmission cycle of the terminal 16 changes, the determination unit 56 can appropriately determine the transmission cycle.

The receiver unit 46 and the transmitter unit 52 may have the function of the external cooperation unit 62. In this case, the processing unit 48*b* does not include the external cooperation unit 62, and the processing device 22*b* does not include the port 66.

The external cooperation unit 62 can acquire the parameter set in the determination unit 56 and the scheduling information regarding the scheduling in operation. The external cooperation unit 62 can notify the external device 64 of the operation status. The scheduling information includes a transmission period, a data size, and an identification number of a terminal 16 executing an application that generates data. FIG. 10 is a diagram for explaining an example of scheduling information transmitted from the external cooperation unit 62 to the external device 64 according to the second embodiment. "rnti" is an identification number of the terminal 16.

Even when a transmission cycle of the terminal 16 changes, the processing device 22*b* according to the second embodiment can appropriately determine the transmission cycle. As a result, the accuracy of synchronization between data generation of the terminal 16 and allocation of communication resources to the terminal 16 is improved, and the effect of preventing a delay in uplink communication is improved.

Third Embodiment

Figure 11:
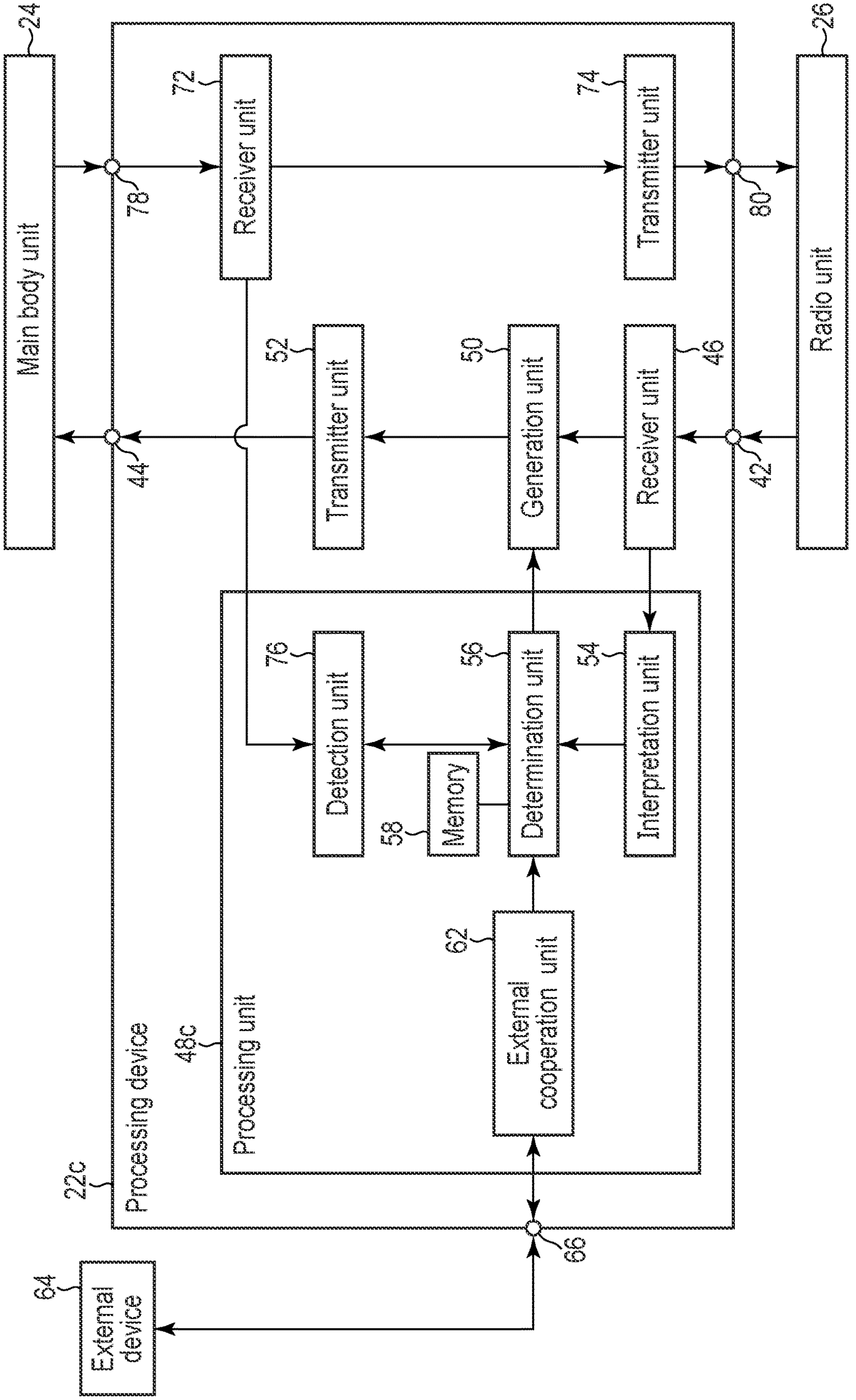
FIG. 11 is a block diagram for explaining an example of a processing device according to a third embodiment.
Figure 12:
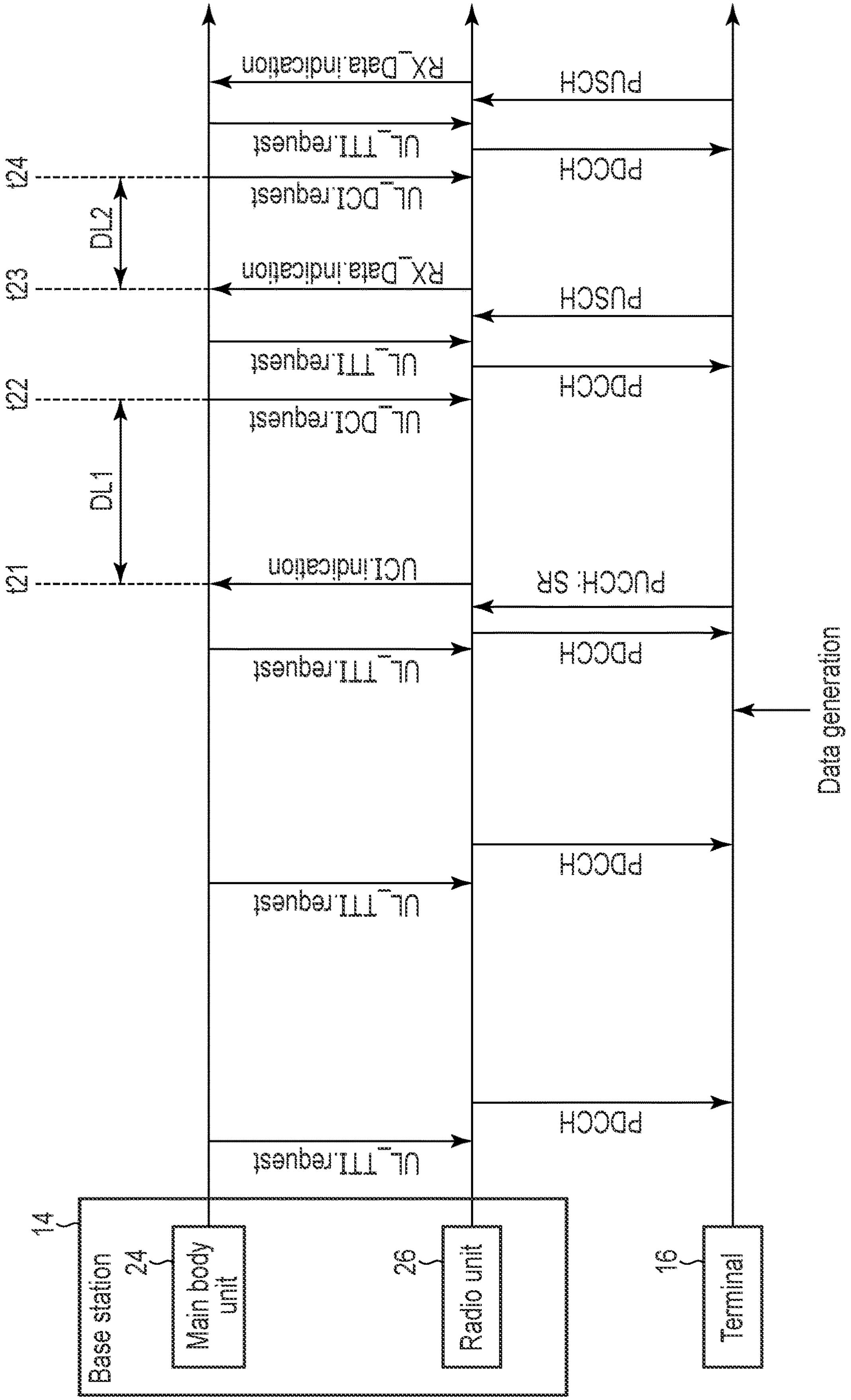
FIG. 12 is a diagram for explaining an example of a communication resource allocation request and an example of allocation information according to the third embodiment.

FIG. 11 is a block diagram for explaining an example of a processing device 22*c* according to a third embodiment. A processing unit 48*c* included in the processing device 22*c* further includes a detection unit 76 as compared with the processing unit 48*b* according to the second embodiment illustrated in FIG. 9. The processing device 22*c* further includes a receiver unit 72, a transmitter unit 74, and ports 78 and 80 as compared with the processing device 22*b* according to the second embodiment illustrated in FIG. 9. The receiver unit 72 receives data from the main body unit 24 via the port 78. The transmitter unit 74 transmits data to the radio unit 26 via the port 80. The detection unit 76 detects a delay from the time when allocation of communication resources is requested (e.g., the time when an allocation request signal is transmitted to the main body unit 24) to the time when the allocation is completed (the time when the terminal 16 receives the allocation information). There are two delays to be detected. Each of the two delays will be described with reference to FIG. 12. FIG. 12 is a diagram for explaining an example of a communication resource allocation request and an example of allocation information according to the third embodiment.

The first delay occurs when communication resources are allocated in response to a scheduling request.

FIG. 12 is a diagram for explaining an example of a communication sequence using the FAPI/nFAPI protocol defined by the small cell forum.

In order to transmit physical uplink control channel (PUCCH) information, which is transmitted according to the radio resource control (RRC), from the radio unit 26 to the main body unit 24, the main body unit 24 periodically transmits UL_TTI.request to the radio unit 26.

The radio unit 26 incorporates UL_DCI.request into downlink control information (DCI) of data transmitted by physical downlink control channel (PDCCH), and transmits DCI to the terminal 16.

When there is user data to be transmitted to the base station 14 in the terminal 16, the terminal 16 transmits a scheduling request to the base station 14 on physical uplink control channel (PUCCH) specified in DCI.

The radio unit 26 transforms the scheduling request transmitted by PUCCH into UCI.indication and transmits UCI.indication to the main body unit 24 (timing t21).

UCI.indication is control data for uplink communication. Seven examples of the control data are as follows. (1) HARQ ACK/NACK only, (2) SR only, (3) HARQ ACK/NACK+SR, (4) CSI only, (5) CSI+SR, (6) HARQ ACK/NACK+CSI, and (7) HARQ ACK/NACK+SR+CSI. SR indicates a scheduling request. CSI indicates channel state information.

The allocation unit in the MAC layer (the Low MAC layer or the High MAC layer) of the main body unit 24 allocates communication resources for uplink communication according to the scheduling request. The main body unit 24 transmits UL_DCI.request (allocation information) indicating the communication resources allocated by the allocation unit to the radio unit 26 (timing t22).

The radio unit 26 incorporates UL_DCI.request into DCI of data transmitted by PDCCH, and transmits DCI to the terminal 16.

A delay DL1 from the transmission of the scheduling request (UCI.indication; timing t21) to the actual allocation (UL_DCI.request; timing t22) occurs according to the implementation of the base station 14 and the use situation of the communication resources. The detection unit 76 detects the delay DL1.

The second delay occurs when communication resources are allocated in response to BSR after the allocation according to the scheduling request. As described above, the main body unit 24 incorporates UL_DCI.request, which is allocation information, into DCI of data transmitted by PDCCH, and transmits DCI to the terminal 16.

The terminal 16 transmits user data and BSR indicating a size of the untransmitted data to the base station 14 by PUSCH using the allocated communication resources.

The radio unit 26 transforms the received data and BSR into RX_Data.indication and transmits RX_Data.indication to the main body unit 24 (timing t23).

The allocation unit in the main body unit 24 allocates communication resources according to the received BSR. The main body unit 24 transmits UL_DCI.request indicating the communication resources allocated by the allocation unit to the radio unit 26 (timing t24).

The radio unit 26 incorporates UL_DCI.request into DCI of data transmitted by PDCCH, and transmits DCI to the terminal 16.

A delay DL2 from the transmission of the allocation request for uplink communication through BSR (RX-_Data.indication; timing t23) to the actual allocation (UL_DCI.request; timing t24) occurs according to the implementation of the base station 14 and the use situation of the communication resources. The detection unit 76 also detects the delay DL2.

In order to cope with a change in transmission cycle of the terminal 16, the determination unit 56 according to the first embodiment instructs the generation unit 50 to transmit a predetermined number of scheduling requests in a predetermined period around a next transmission timing. In contrast, the determination unit 56 according to the third embodiment adjusts a timing at which the generation unit 50 is instructed to transmit a scheduling request based on the delays DL1 and DL2 detected by the detection unit 76.

For example, in a case where the detection unit 76 detects that a delay DL1 of 6 ms occurs, the determination unit 56 instructs the generation unit 50 to transmit a scheduling request at a timing (next transmission timing—6 ms) that is earlier than the next transmission timing by 6 ms. As a result, a timing at which communication resources are allocated coincides with a timing at which next user data to be transmitted is generated.

When a size of data to be transmitted is large, for example, 100 bytes or more, communication using communication resources allocated according to BSR is performed after communication using communication resources allocated according to a scheduling request. In this case, it is necessary to adjust a timing at which an allocation request is transmitted in consideration of a delay DL1 related to a first time of data communication and a delay DL2 related to second or subsequent time of data communication.

For example, in a case where the detection unit 76 detects that a delay DL1 of 6 ms occurs and a delay DL2 of 6 ms occurs, the determination unit 56 instructs the generation unit 50 to transmit a scheduling request at a timing (next transmission timing—12 ms) that is earlier than the next transmission timing by 12 ms. As a result, a timing at which communication resources are allocated coincides with a timing at which next data to be transmitted is generated.

Figure 13:
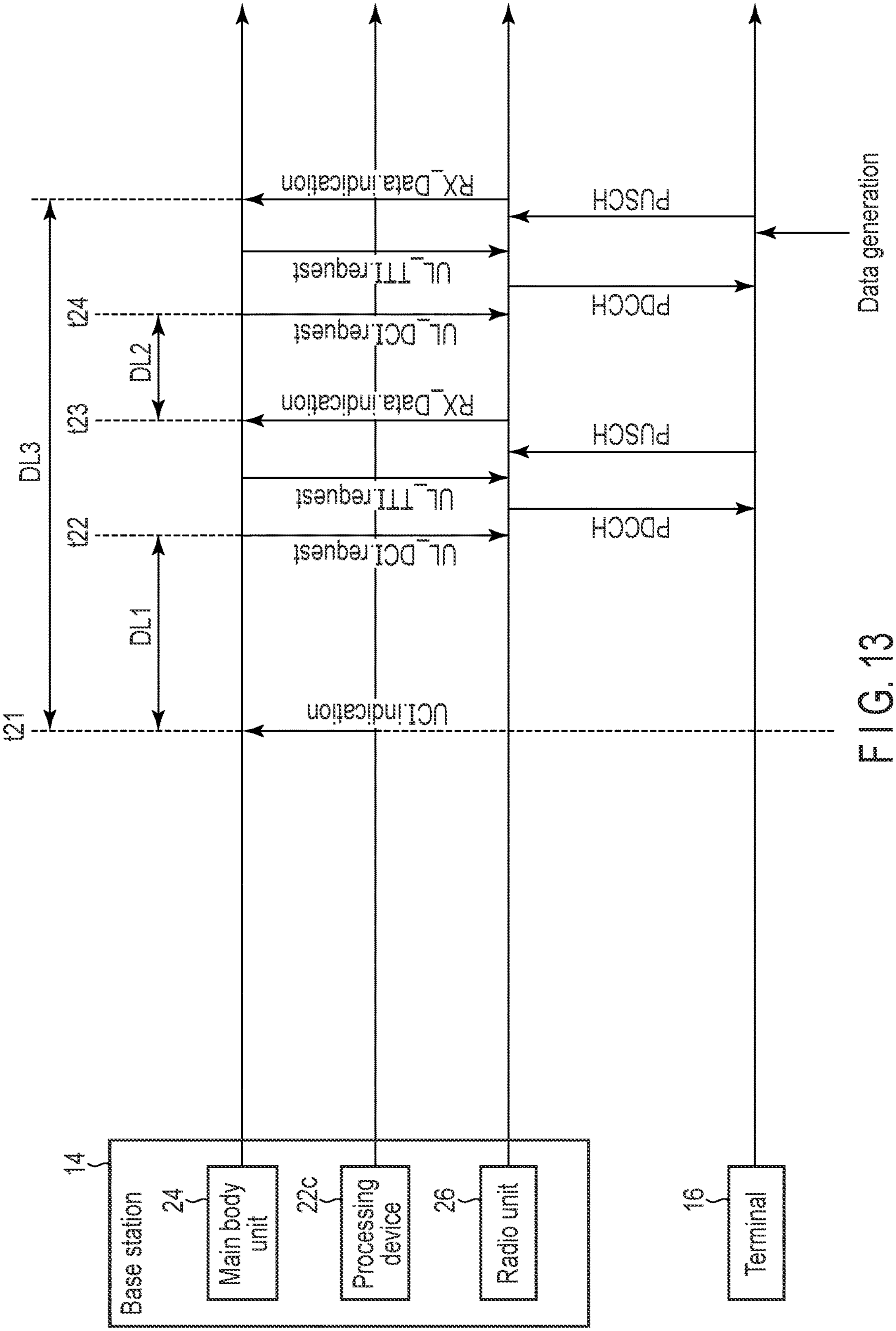
FIG. 13 is a diagram for explaining an example of an allocation request according to the third embodiment.

FIG. 13 is a diagram for explaining an example of an allocation request in consideration of delays DL1 and DL2 according to the third embodiment.

The processing device 22*c* according to the third embodiment adjusts the timing t21 at which a scheduling request is transmitted and the timing t23 at which an allocation request based on BSR is transmitted so that a data generation timing is immediately before a timing at which a delay DL3 ends in consideration of the delay DL3 in allocation processing of the base station 14. As a result, the accuracy of synchronization between user data generation of the terminal 16 and allocation of communication resources to the terminal 16 is improved, and the effect of preventing a delay in uplink communication is improved.

Fourth Embodiment

Figure 14:
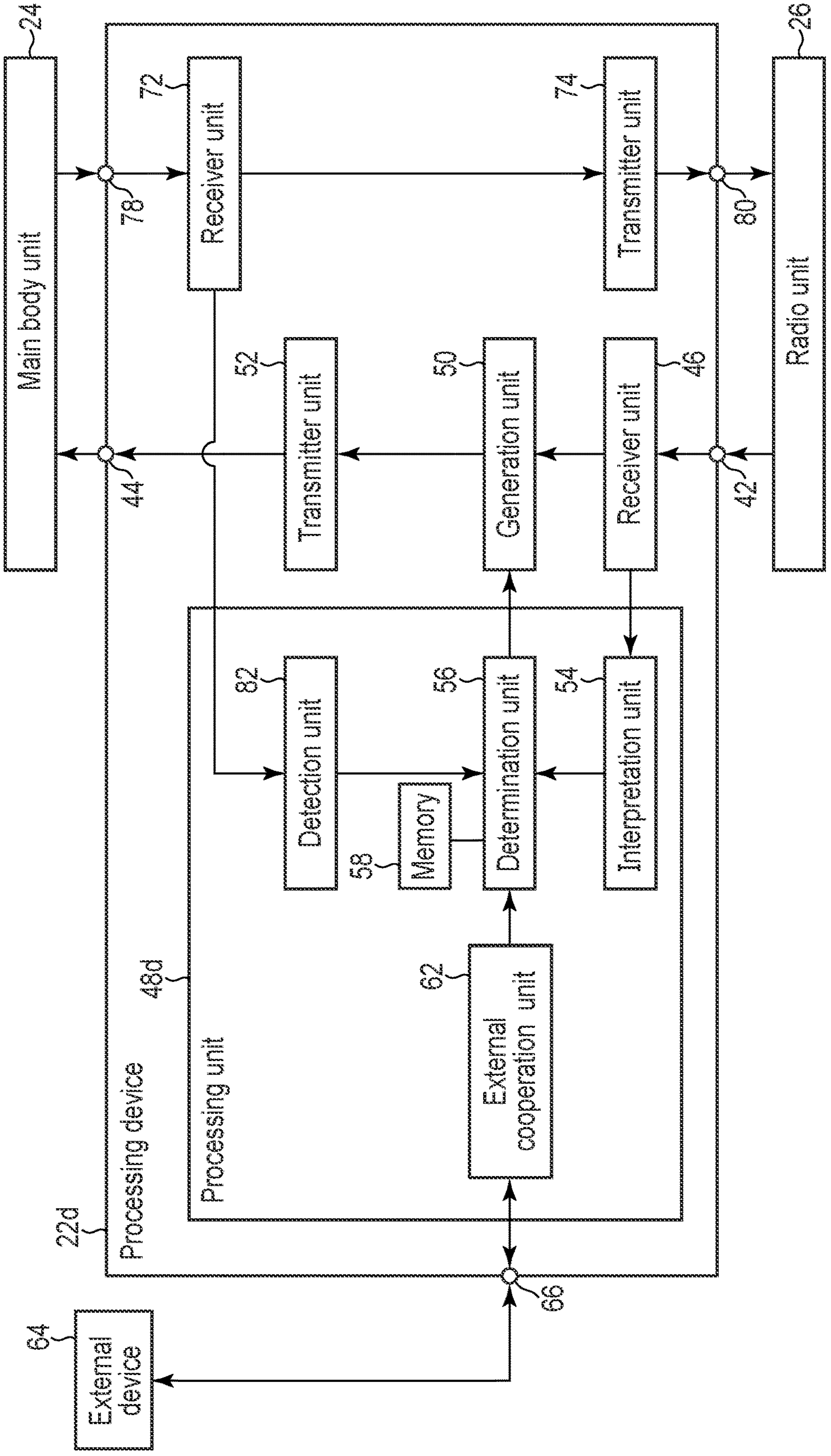
FIG. 14 is a block diagram for explaining an example of a processing device according to a fourth embodiment.

FIG. 14 is a block diagram for explaining an example of a processing device 22*d* according to a fourth embodiment. A processing unit 48*d* included in the processing device 22*d* is different from the processing unit 48*c* according to the third embodiment illustrated in FIG. 11 in that a detection unit 82 is provided instead of the detection unit 76.

The fourth embodiment improves the accuracy of determination of the user data transmission cycle described in the first embodiment. The processing device 22*a* according to the first embodiment estimates a next transmission timing based on a transmission cycle specified in a parameter file created in advance, and determines whether the terminal 16 has transmitted user data in a predetermined period around the next transmission timing. In the fourth embodiment, a next transmission timing is estimated based on a transmission cycle of PUCCH as well.

Figure 15:
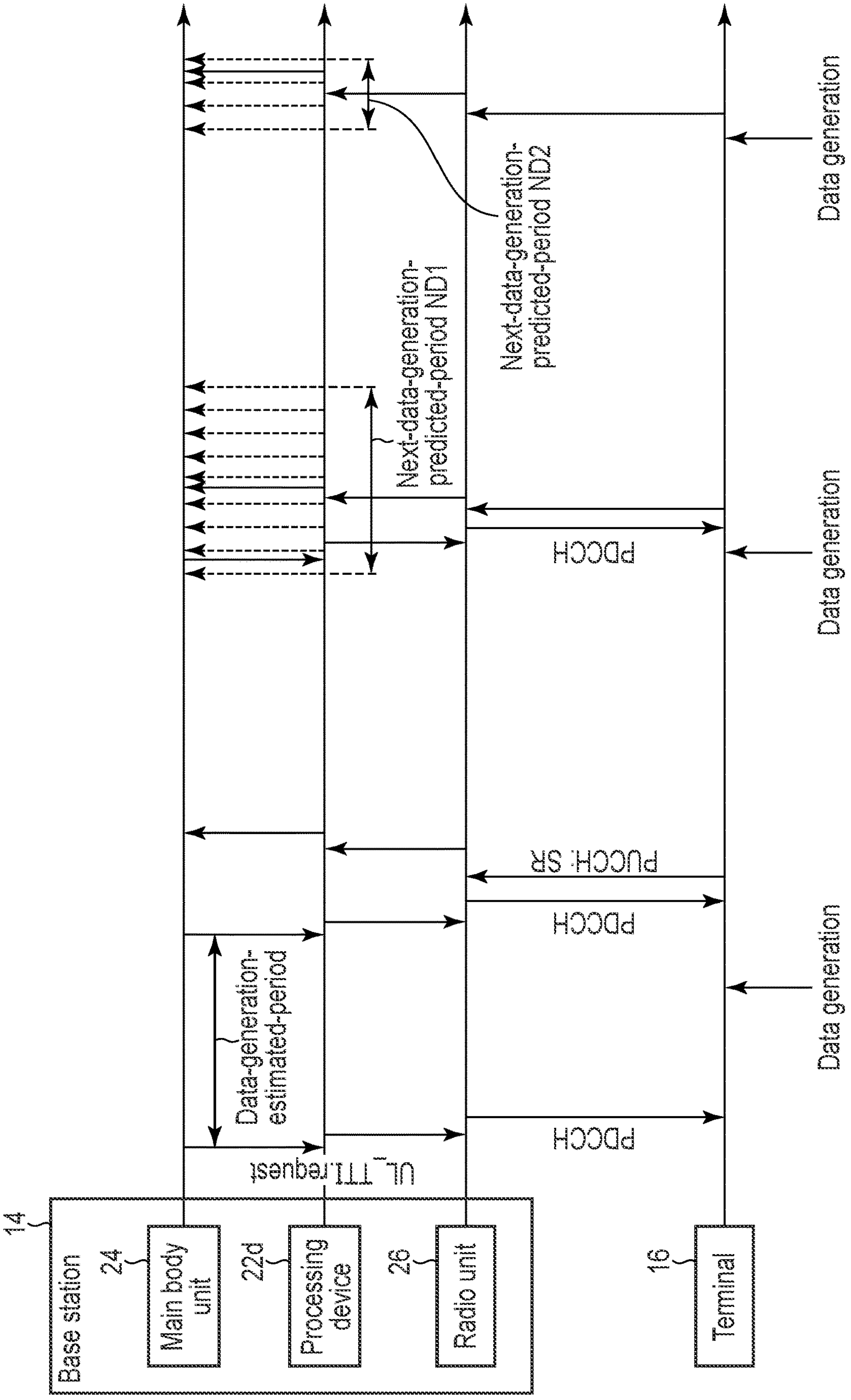
FIG. 15 is a diagram for explaining an example of processing of the detection unit according to the fourth embodiment.

FIG. 15 is a diagram for explaining an example of processing of the detection unit 82 according to the fourth embodiment. As illustrated in FIG. 12, in order to transmit PUCCH information, which is transmitted according to RRC, from the radio unit 26 to the main body unit 24, the main body unit 24 periodically transmits UL_TTI.request to the radio unit 26. The radio unit 26 incorporates UL_DCI.request into DCI of data transmitted by PDCCH, and transmits DCI to the terminal 16. When there is user data to be transmitted to the base station 14 in the terminal 16, the terminal 16 transmits a scheduling request to the base station 14 by PUCCH specified in DCI.

As illustrated in FIG. 15, in a case where a scheduling request is transmitted, a period between the timing at which UL_TTI.request is received immediately before the scheduling request and the timing at which previous UL_TTI.request is received is regarded as a data-generation-estimated-period. The user data generation cycle is estimated to coincide with the cycle of UL_TTI.request.

Since the main body unit 24 transmits UL_TTI.request for each terminal 16, the detection unit 82 detects a transmission cycle of PUCCH for each terminal 16. The detection unit 82 transmits the detected transmission cycle of PUCCH to the determination unit 56.

The determination unit 56 determines the user data transmission cycle as illustrated in FIGS. 5 and 6, similarly to that in the first embodiment. That is, the determination unit 56 acquires the transmission cycle of PUCCH to obtain a first next-data-generation-predicted-period ND1. A start timing of the first next-data-generation-predicted-period ND1 is set using a certain transmission cycle from the start timing of the data-generation-estimated-period.

The determination unit 56 determines whether user data is received in the next-data-generation-predicted-period ND1. When user data is received in the next-data-generation-predicted-period ND1, the determination unit 56 determines the estimated cycle as a transmission cycle.

When user data is not received in the next-data-generation-predicted-period, the determination unit 56 changes the estimated cycle and determines whether user data is received. FIG. 15 illustrates an example in which the interpretation unit 54 receives user data in the next-data-generation-predicted-period.

After determining the estimated cycle as a transmission cycle, the determination unit 56 determines a second next-data-generation-predicted-period ND2. A start timing of the second next-data-generation-predicted-period ND2 is after the transmission cycle (determination cycle) from the start timing of the first next-data-generation-predicted-period ND1. Since the data transmission cycle is determined, the second next-data-generation-predicted-period ND2 may be shorter than the first next-data-generation-predicted-period ND1.

Figure 16:
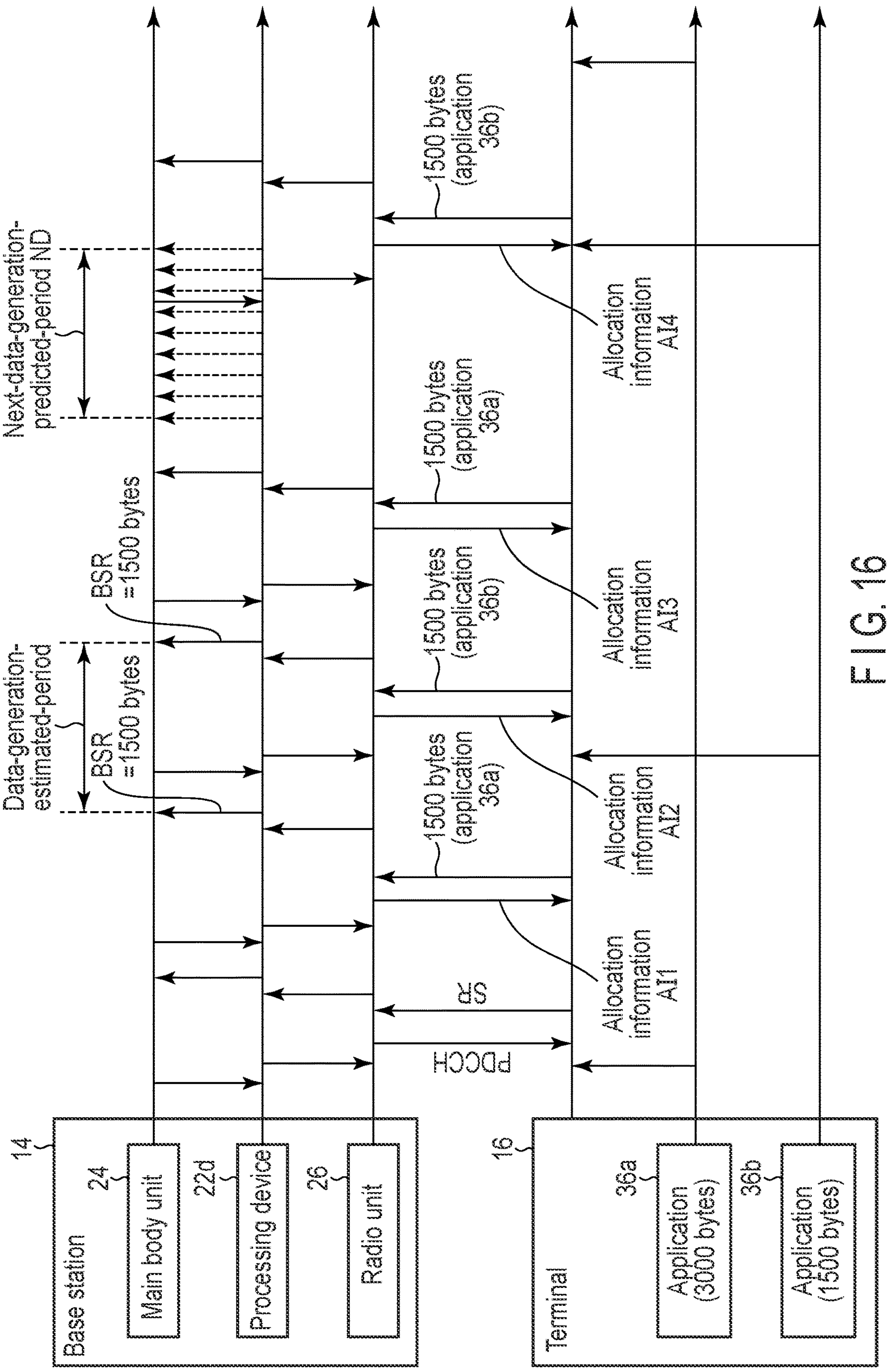
FIG. 16 is a diagram for explaining an example of processing of a processing device according to the fourth embodiment

The processing device 22*d* according to the fourth embodiment detects generation of user data in the terminal 16 based on BSR as well. FIG. 16 is a diagram for explaining an example of processing in which the processing device 22*d* according to the fourth embodiment detects generation of user data based on BSR.

The terminal 16 executes an application 36*a* and an application 36*b*. The application 36*a* generates 3000-byte user data. The application 36*b* generates 1500-byte user data. Here, the size of user data for uplink communication allocated in response to the scheduling request is 1500 bytes. In practice, it is assumed that the size of the allocated user data varies depending on the encoding system used according to the setting of the base station, the communication environment, and the like.

When the application 36*a* generates 3000-byte user data, the terminal 16 transmits a scheduling request to the base station 14 after receiving PUCCH.

In response to the scheduling request, the base station 14 allocates 1500-byte communication resources for user data communication, and transmits allocation information AI1 to the terminal 16.

According to the allocation information AI1, the terminal 16 transmits 1500-byte user data of the 3000-byte user data generated by the application 36*a* and BSR (1500 bytes) to the base station 14.

The allocation unit in the main body unit 24 allocates 1500-byte communication resources for user data communication in response to BSR, and transmits allocation information AI2 to the terminal 16.

According to the allocation information AI2, the terminal 16 transmits the remaining 1500-byte user data of the 3000-byte user data generated by the application 36*a* and BSR to the base station 14.

If no user data is newly generated in the terminal 16 between the two data transmissions, BSR is 0. That is, if the value of BSR decreases during the two data transmissions, no user data is generated between the two data transmissions.

It is assumed that the application 36*b* generates 1500-byte user data between the two data transmissions. In this case, BSR represents 1500 (=1500+1500−1500) bytes. In a case where 100-byte user data is generated, BSR is 100 bytes. In a case where 3000-byte user data is generated, BSR represents 3000 bytes. That is, if the value of BSR remains unchanged or increases during the two data transmissions, user data is generated between the two data transmissions.

The allocation unit in the main body unit 24 allocates 1500-byte communication resources for data communication in response to BSR, and transmits allocation information AI3 to the terminal 16.

According to the allocation information AI3, the terminal 16 transmits the 1500-byte user data generated by the application 36*b* and BSR (0 bytes) to the base station 14.

When the value of the received BSR remains unchanged or increases as compared with the previous BSR, the determination unit 56 sets a period between two times of reception of BSR, that is, two times of transmission of user data, as a data-generation-estimated-period.

Similarly to the acquisition of the transmission cycle of PUCCH from the detection unit 82 and the determination of the first next-data-generation-predicted-period, the determination unit 56 determines a first next-data-generation-predicted-period ND1 based on the data generation-estimated period. The subsequent processing is similar to the processing in FIG. 15.

The processing device 22*d* according to the fourth embodiment is capable of more accurately predict a timing at which user data is to be generated based on the cycle of PUCCH and a change in BSR when user data is transmitted. As a result, the accuracy of synchronization between user data generation of the terminal 16 and allocation of communication resources to the terminal 16 is improved, and the effect of preventing a delay in uplink communication is improved.

Fifth Embodiment

Figure 17:
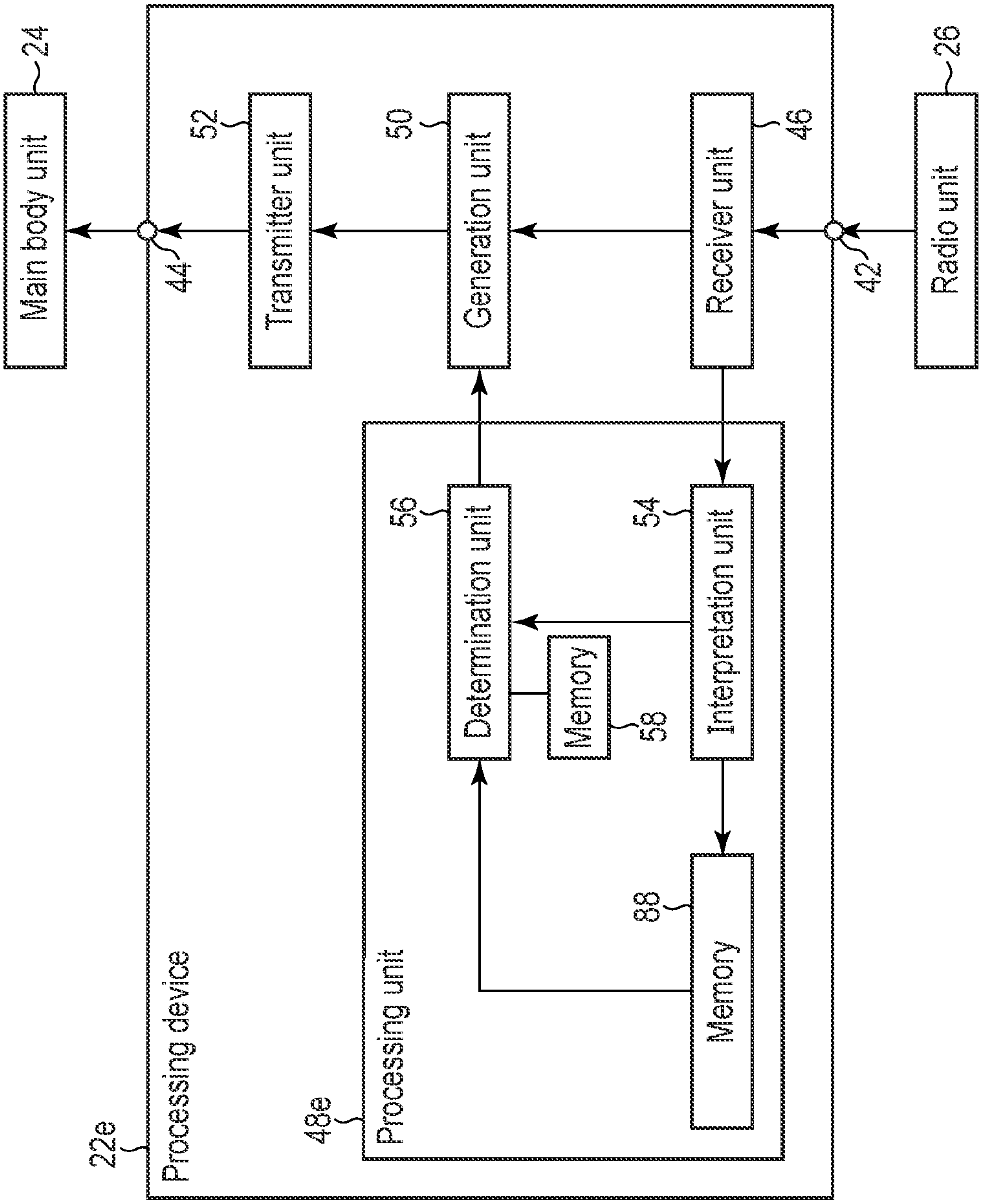
FIG. 17 is a block diagram for explaining an example of a processing device according to a fifth embodiment.

FIG. 17 is a block diagram for explaining an example of a processing device 22*e* according to a fifth embodiment. A processing unit 48*e* included in the processing device 22*e* is different from the processing unit 48*a* according to the first embodiment illustrated in FIG. 3 in that a memory 88 is added.

The determination unit 56 according to the first embodiment determines a next transmission timing based on the transmission cycle determined in advance. The determination unit 56 according to the second embodiment determines a next transmission timing based on the transmission cycle acquired from the external device 64. The memory 88 stores a transmission cycle and a size of user data in association with each other. The interpretation unit 54 obtains a transmission cycle and a size of user data, transmits "interval" indicating the transmission cycle and "data_size" indicating the size to the determination unit 56, and writes "interval" and "data_size" in the memory 88. Note that the memory 58 and the memory 88 may be physically the same memory or different memories.

Figure 18A:
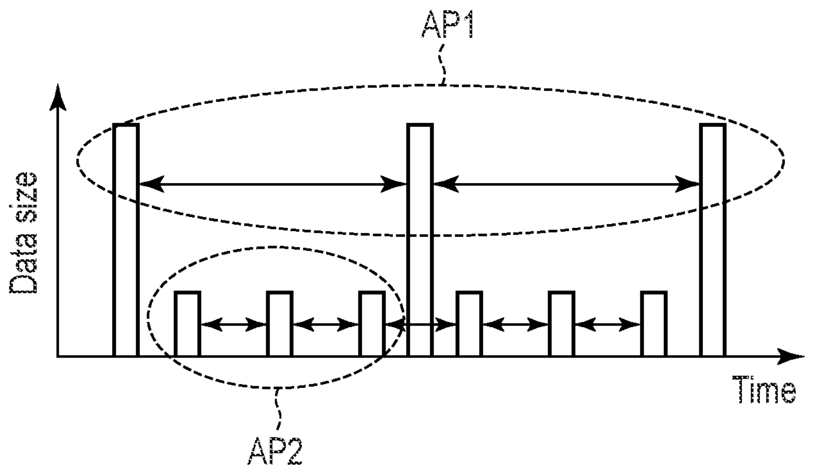
FIG. 18A is a diagram for explaining an example of processing of a determination unit according to the fifth embodiment.
Figure 18B:
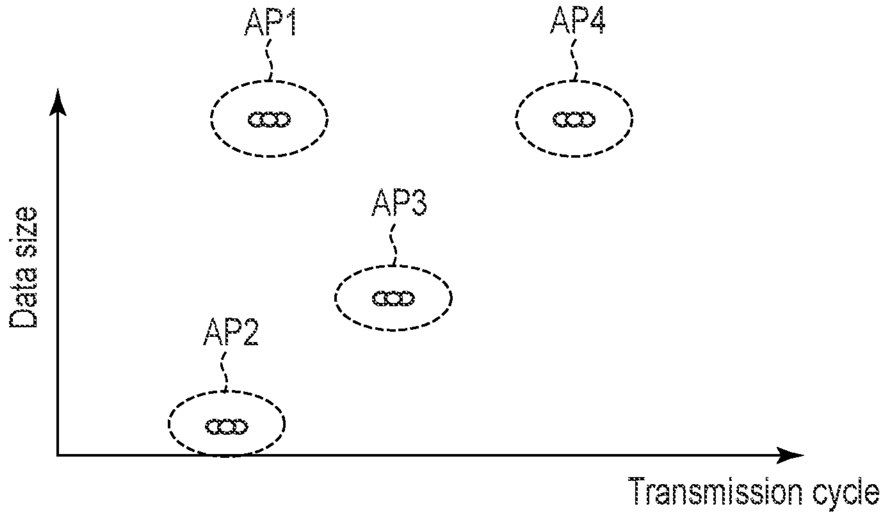
FIG. 18B is a diagram for explaining the example of processing of the determination unit according to the fifth embodiment.

FIGS. 18A and 18B are diagrams for explaining an example of processing of the determination unit 56 according to the fifth embodiment.

FIG. 18A is a diagram for explaining an example of a relationship between a size and a transmission cycle of user data transmitted by the terminal 16. It is expected that user data generated from the same application has the same data size and is transmitted at the same cycle. When user data having the same data size is received three times at substantially equal transmission intervals, it can be estimated that these user data are data generated from the same application. For example, it is estimated that application AP1 generates user data having a relatively large size at a relatively long cycle. It is estimated that application AP2 generates user data having a relatively small size at a relatively short cycle.

The memory 88 stores a pair of a data size and a transmission cycle transmitted from the interpretation unit 54. FIG. 18B is a diagram for explaining an example of a relationship between a data size and a transmission cycle for each application stored in the memory 88. The user data generated from the same application has the same data size and is transmitted at a similar cycle. The determination unit 56 determines a transmission cycle by determining the data size and transmission cycle of what application the data size and transmission cycle transmitted from the interpretation unit 54 are identical or similar to. After determining the transmission cycle, the determination unit 56 instructs the generation unit 50 to transmit a scheduling request.

Sixth Embodiment

Figure 19:
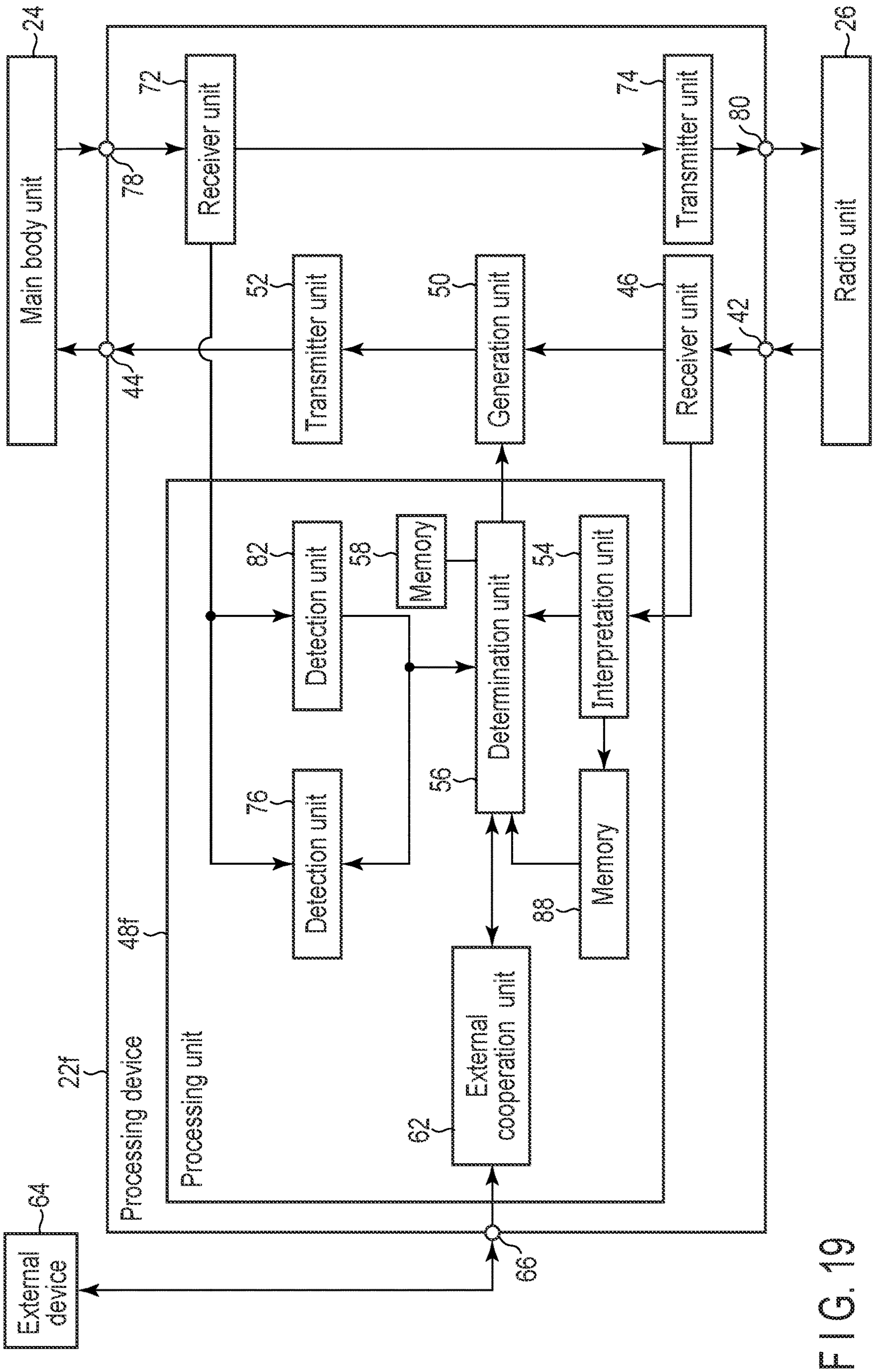
FIG. 19 is a diagram for illustrating an example of a processing device *22f* of a sixth embodiment.

At least two of the first to fifth embodiments can be implemented in combination. FIG. 19 is a diagram for illustrating an example of a processing device 22*f* of a sixth embodiment in which, for example, all of the first to fifth embodiments are combined together. Although not illustrated, it is also possible to combine two, three, or four of the first to fifth embodiments.

Seventh Embodiment

The processing device 22 according to any of the first to sixth embodiments is connected between two functional units (the main body unit 24 and the radio unit 26). The implementation of the processing device 22 is not limited thereto. Other implementation examples include an example in which the processing device 22 is incorporated in the main body unit 24 or the radio unit 26, and an example in which the processing device 22 is connected to the main body unit 24 in parallel with the main body unit 24 or connected to the radio unit 26 in parallel with the radio unit 26. When the processing device 22 is incorporated in the main body unit 24 or the radio unit 26, the receiver unit, the generation unit, and the transmitter unit of the main body unit 24 or the radio unit 26 can be used as the receiver unit 46, the generation unit 50, and the transmitter unit 52 included in the processing device 22. Thus, the processing device 22 includes only the processing unit 48. In the following description of the embodiment, the processing unit 48 may be any of the processing units **48*a* to 48*f*** according to the first to sixth embodiments.

Figure 20:
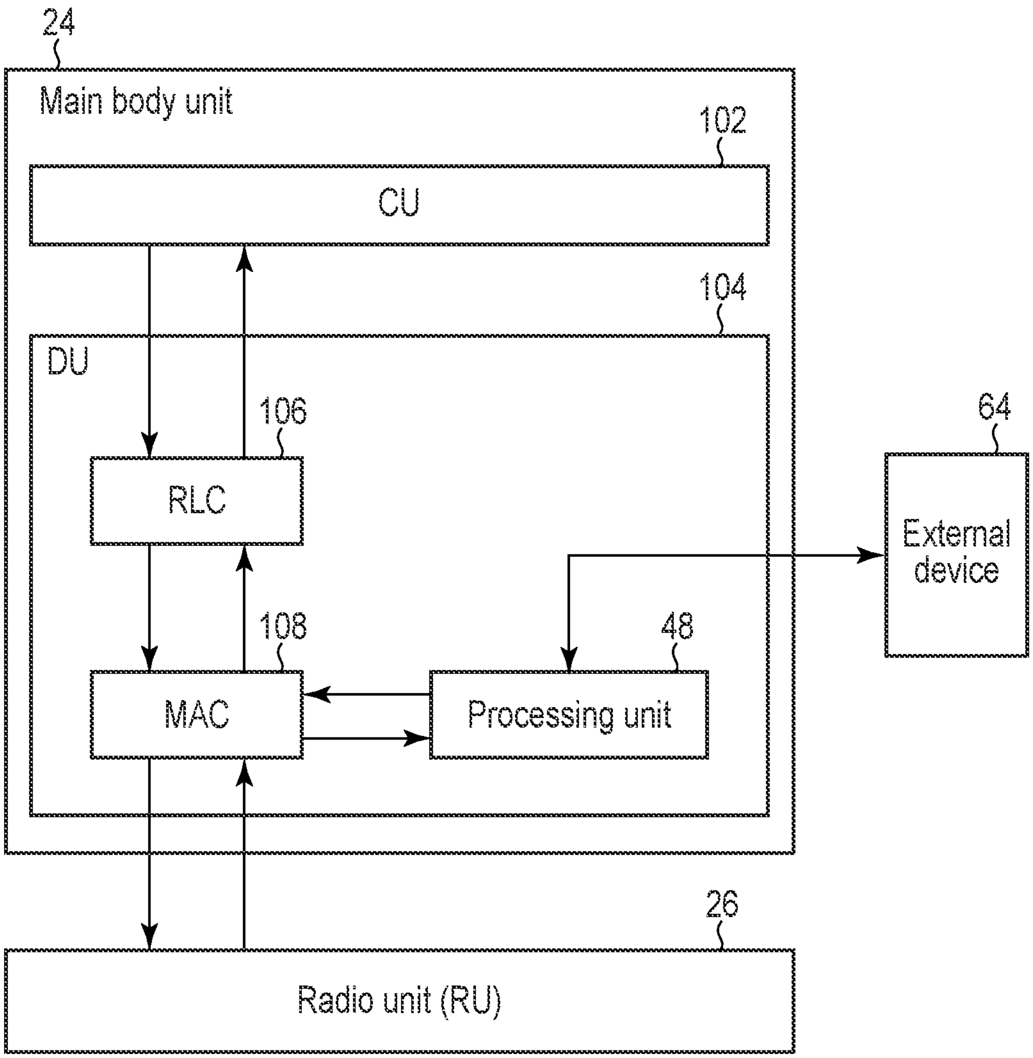
FIG. 20 is a diagram for explaining an implementation example of a processing unit according to a seventh embodiment.

FIG. 20 is a diagram for explaining an implementation example of a processing unit 48 according to a seventh embodiment. The main body unit 24 includes a CU 102 and a DU 104. The DU 104 includes an RLC (High RLC and Low RLC) layer 106, a MAC (High MAC and Low MAC) layer 108, and a processing unit 48. The processing unit 48 is located in the DU 104 in parallel with the MAC layer 108. The processing unit 48 directly cooperates with the MAC layer 108.

Since the processing unit 48 directly cooperates with the MAC layer 108, it is possible to receive data acquired by the MAC layer 108 and directly issue an instruction to the MAC layer 108.

An example of data acquired by the MAC layer 108 and transmitted to the processing unit 48 is {rnti: "0123", frame: X, slot: Y, data_type: UP, data_size: 300, BSR: 1500}. "rnti" indicates an identification number (radio network temporary identifier) of a terminal. "frame" and "slot" indicate a frame number and a slot number of data communicated inside the base station 14. "data_type" indicates a data type of uplink/downlink communication. "data_size" indicates a data size. BSR indicates a size of untransmitted data. BSR is an uplink communication parameter. Uplink communication parameters other than BSR may be included.

When receiving data from the MAC layer 108, the processing unit 48 determines a transmission cycle based on the received data, and transmits an instruction related to an allocation request to the MAC layer 108 at a timing corresponding to the determined timing. An example of the instruction is {rnti: "0123", status: "start"}. "status" represents a parameter related to an allocation instruction. "start" gives an instruction to start allocation.

The MAC layer 108 includes an allocation unit that allocates communication resources to the terminal 16 in response to a scheduling request. Furthermore, the MAC layer 108 includes the components of the processing device 22 other than the processing unit 48, that is, the functions of the receiver unit 46, the generation unit 50, and the transmitter unit 52. When receiving an instruction to start allocation, the allocation unit allocates communication resources and transmits allocation information to the terminal 16 via the radio unit (RU) 26.

Eighth Embodiment

Figure 21:
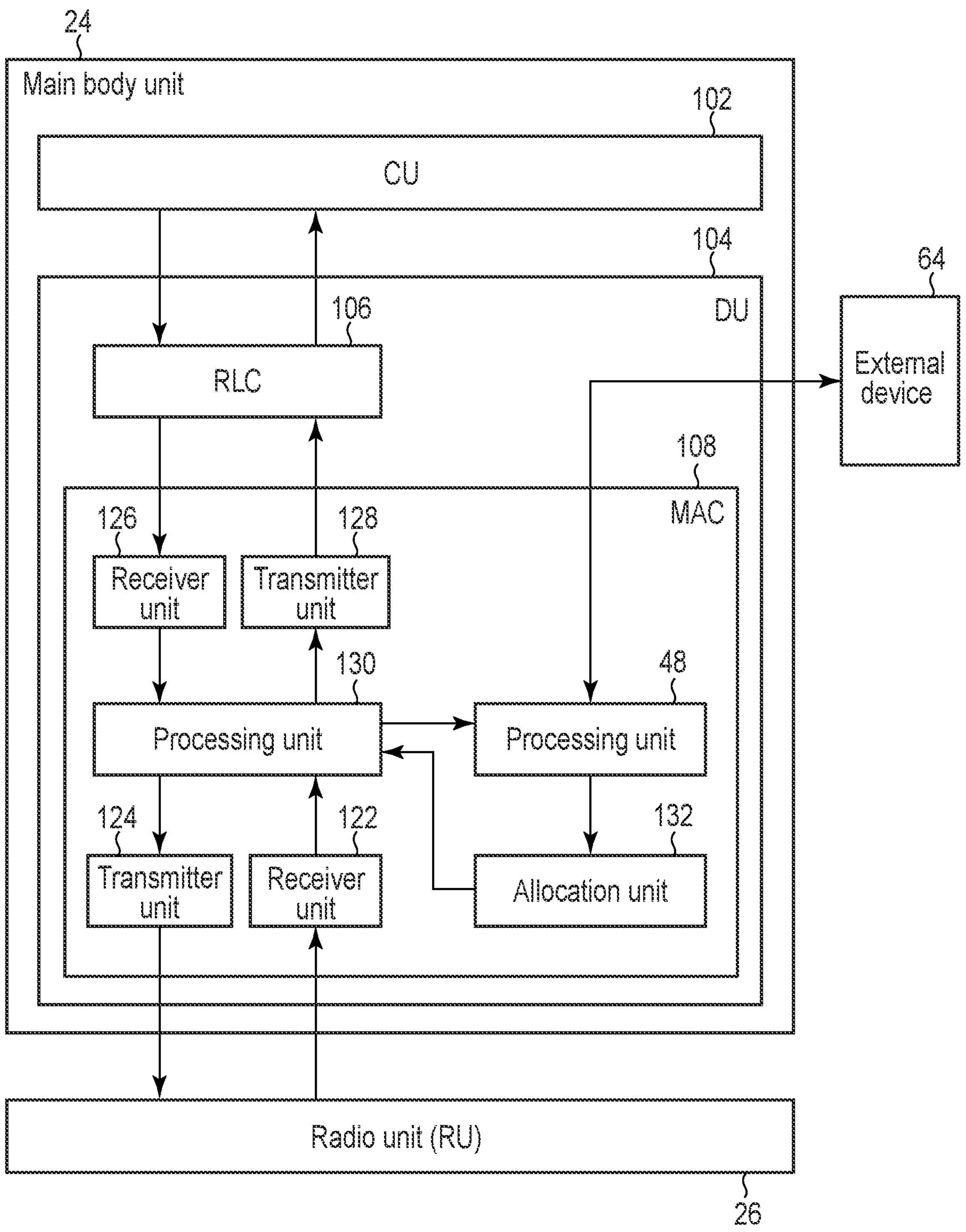
FIG. 21 is a diagram for explaining an implementation example of a processing unit according to an eighth embodiment.

FIG. 21 is a diagram for explaining an implementation example of a processing unit 48 according to an eighth embodiment. The processing unit 48 is incorporated into the MAC layer 108. The MAC layer 108 further includes a receiver unit 122, a transmitter unit 124, a receiver unit 126, a transmitter unit 128, a processing unit 130, and an allocation unit 132. The receiver unit 122 and the transmitter unit 124 are connected to the radio unit (RU) 26. The receiver unit 126 and the transmitter unit 128 are connected to the RLC layer 106. The processing unit 48 and the allocation unit 132 are located in the MAC layer 108 in parallel with the processing unit 130. The processing unit 130 includes the components of the processing device 22 other than the processing unit 48, that is, the functions of the receiver unit 46, the generation unit 50, and the transmitter unit 52.

The processing unit 130 transmits data from the receiver unit 122 to the transmitter unit 128, and transmits data from the receiver unit 126 to the transmitter unit 124. The processing unit 130 further transmits data from the receiver unit 122 to the processing unit 48. An example of data transmitted from the processing unit 130 to the processing unit 48 is {rnti: "0123", frame: X, slot: Y, data_type: UP, data_size: 300, BSR: 1500}.

When receiving data from the processing unit 130, the processing unit 48 determines a transmission cycle based on the received data, and transmits an instruction related to an allocation request to the allocation unit 132 at a timing corresponding to the determined timing. An example of the instruction is {rnti: "0123", status: "start"}. When receiving an instruction to start allocation, the allocation unit 132 allocates communication resources and transmits allocation information to the terminal 16 via the processing unit 130 and the radio unit (RU) 26. The allocation unit 132 may be included in the processing unit 48 or any of the processing units **48*a* to 48*f***.

Ninth Embodiment

Figure 22:
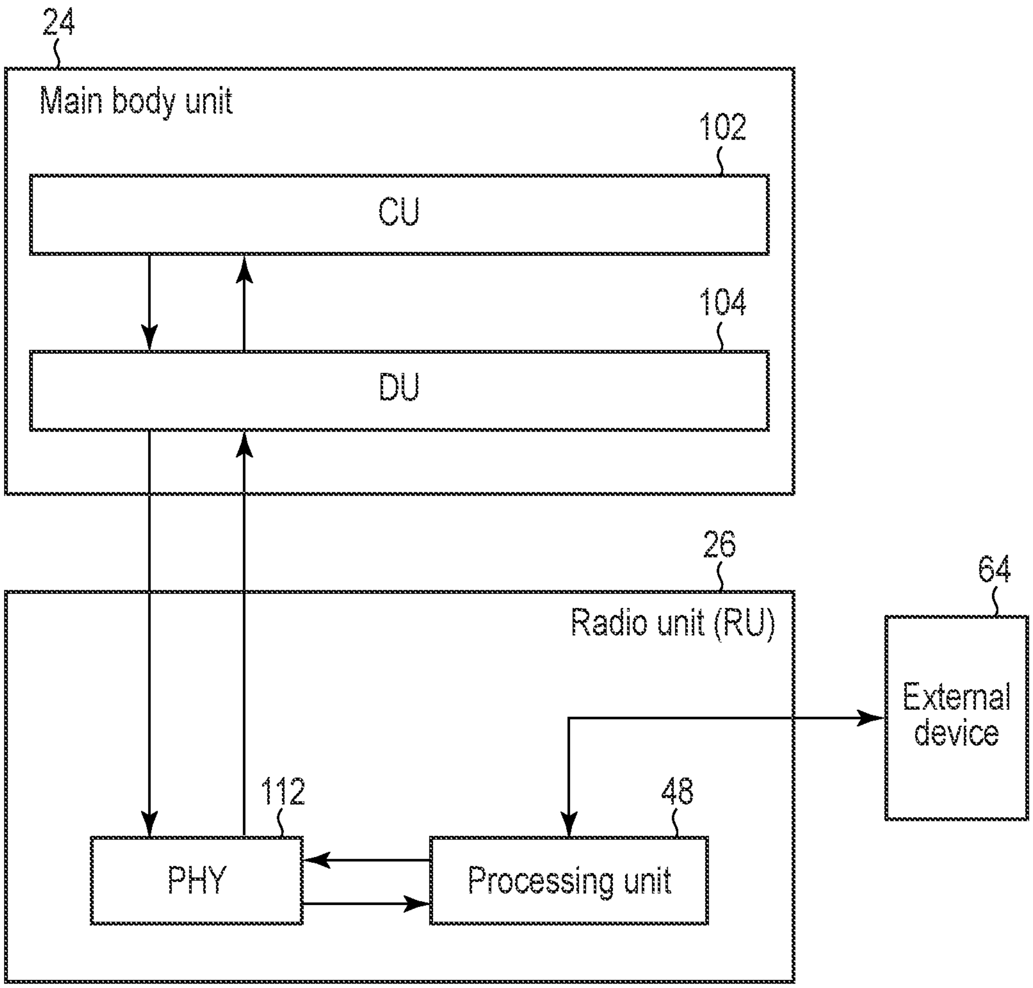
FIG. 22 is a diagram for explaining an implementation example of a processing unit according to a ninth embodiment.

FIG. 22 is a diagram for explaining an implementation example of a processing unit 48 according to a ninth embodiment. The radio unit (RU) 26 includes a PHY (High PHY and Low PHY) layer 112. The processing unit 48 is located in the radio unit (RU) 26 in parallel with the PHY layer 112. The processing unit 48 directly cooperates with the PHY layer 112. The PHY layer 112 includes the components of the processing device 22 other than the processing unit 48, that is, the functions of the receiver unit 46, the generation unit 50, and the transmitter unit 52.

Since the processing unit 48 directly cooperates with the PHY layer 112, the processing unit 48 can receive data acquired by the PHY layer 112 and directly issue an instruction to the PHY layer 112.

An example of data acquired by the PHY layer 112 and transmitted to the processing unit 48 is {rnti: "0123", frame: X, slot: Y, MAC_PAYLOAD="01230123 . . . "}. That is, the PHY layer 112 also transmits MAC_PAYLOAD, which is transmitted to the DU 104 (MAC layer), to the processing unit 48.

The processing unit 48 interprets MAC_PAYLOAD, determines a transmission cycle based on the PHY data, and transmits a first instruction related to an allocation request to the PHY layer 112 at a timing corresponding to the determined timing. An example of the first instruction is {rnti: "0123", status: "start"}. Alternatively, the processing unit 48 interprets MAC_PAYLOAD, determines a transmission cycle based on the PHY data, and transmits a second instruction to notify the PHY layer 112 of new MAC_PAYLOAD at a timing corresponding to the determined timing.

BSR is updated based on the new MAC_PAYLOAD. An example of the second instruction is {rnti: "0123", MAC_PAYLOAD="0103 . . . "}.

When receiving the first instruction or the second instruction, the PHY layer 112 transmits an allocation request to the main body unit 24.

When receiving the allocation request, the allocation unit in the MAC layer of the DU 104 of the main body unit 24 allocates communication resources and transmits allocation information to the terminal 16 via the radio unit (RU) 26.

Tenth Embodiment

Figure 23:
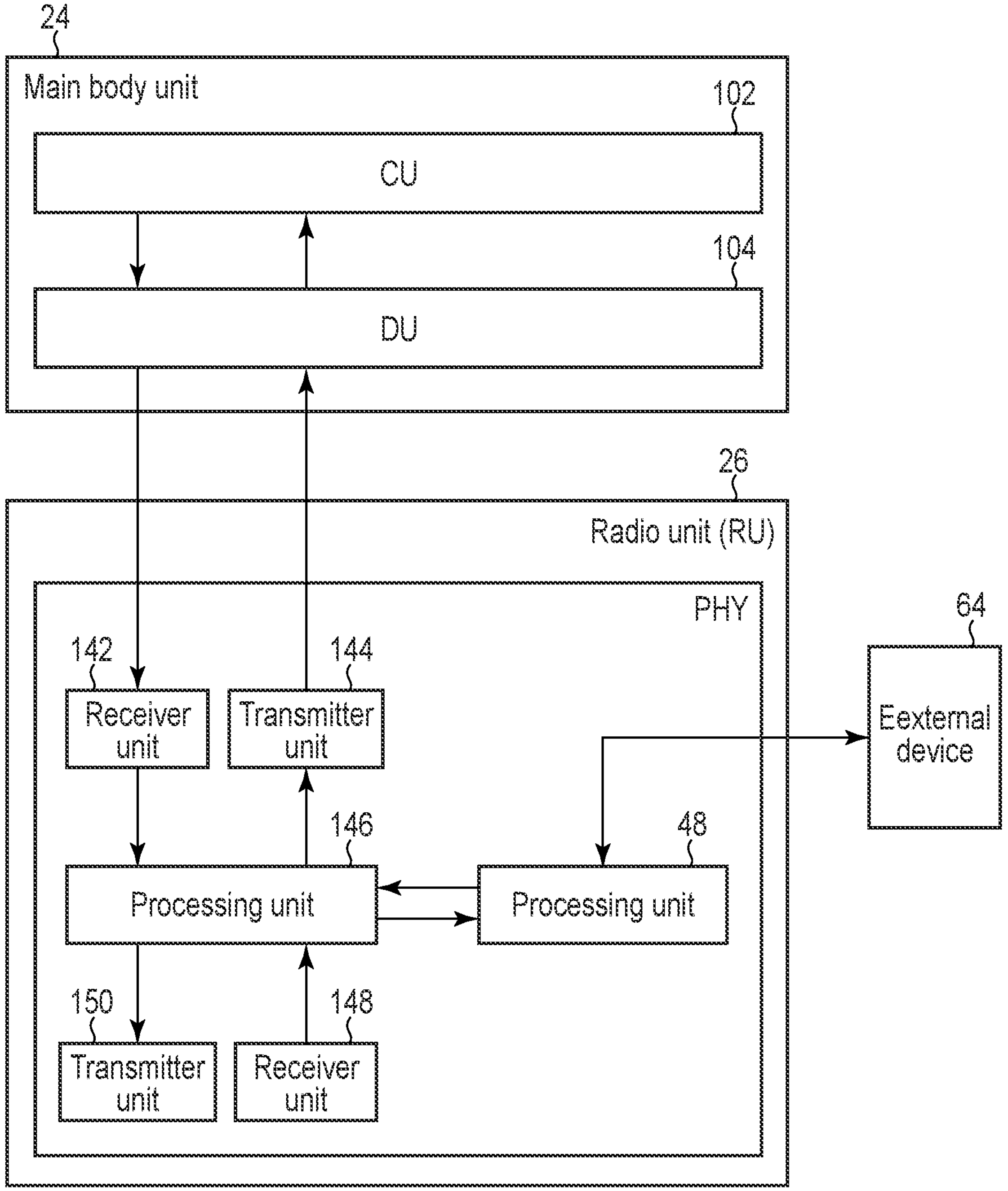
FIG. 23 is a diagram for explaining an implementation example of a processing unit 48 according to a tenth embodiment.

FIG. 23 is a diagram for explaining an implementation example of a processing unit 48 according to a tenth embodiment. The processing unit 48 is incorporated into the PHY layer 112. Further, the PHY layer 112 includes a receiver unit 142, a transmitter unit 144, a receiver unit 148, a transmitter unit 150, and a processing unit 146. The receiver unit 142 and the transmitter unit 144 are connected to the DU 104 of the main body unit 24. The receiver unit 148 and the transmitter unit 150 are connected to the terminal 16. The processing unit 48 is located in the PHY layer 112 in parallel with the processing unit 146. The processing unit 146 includes the components of the processing device 22 other than the processing unit 48, that is, the functions of the receiver unit 46, the generation unit 50, and the transmitter unit 52.

The processing unit 146 transmits the received data to the processing unit 48. An example of data transmitted from the processing unit 146 to the processing unit 48 is {rnti: "0123", frame: X, slot: Y, MAC_PAYLOAD="01230123 . . . "}. That is, the processing unit 146 also transmits MAC_PAYLOAD, which is transmitted to the DU 104 (MAC layer), to the processing unit 48.

The processing unit 48 interprets MAC_PAYLOAD, determines a transmission cycle based on the PHY data, and transmits a first instruction related to an allocation request to the processing unit 146 at a timing corresponding to the determined timing. An example of the first instruction is {rnti: "0123", status: "start"}. Alternatively, the processing unit 48 interprets MAC_PAYLOAD, determines a transmission cycle based on the PHY data, and transmits a second instruction to notify the processing unit 146 of new MAC_PAYLOAD at a timing corresponding to the determined timing. An example of the second instruction is {rnti: "0123", MAC_PAYLOAD="0103 . . . "}.

When receiving the first instruction or the second instruction, the processing unit 146 transmits an allocation request to the main body unit 24.

The allocation unit in the MAC layer of the DU 104 of the main body unit 24 allocates communication resources and transmits allocation information to the terminal 16 via the radio unit (RU) 26.

Eleventh Embodiment

Figure 24:
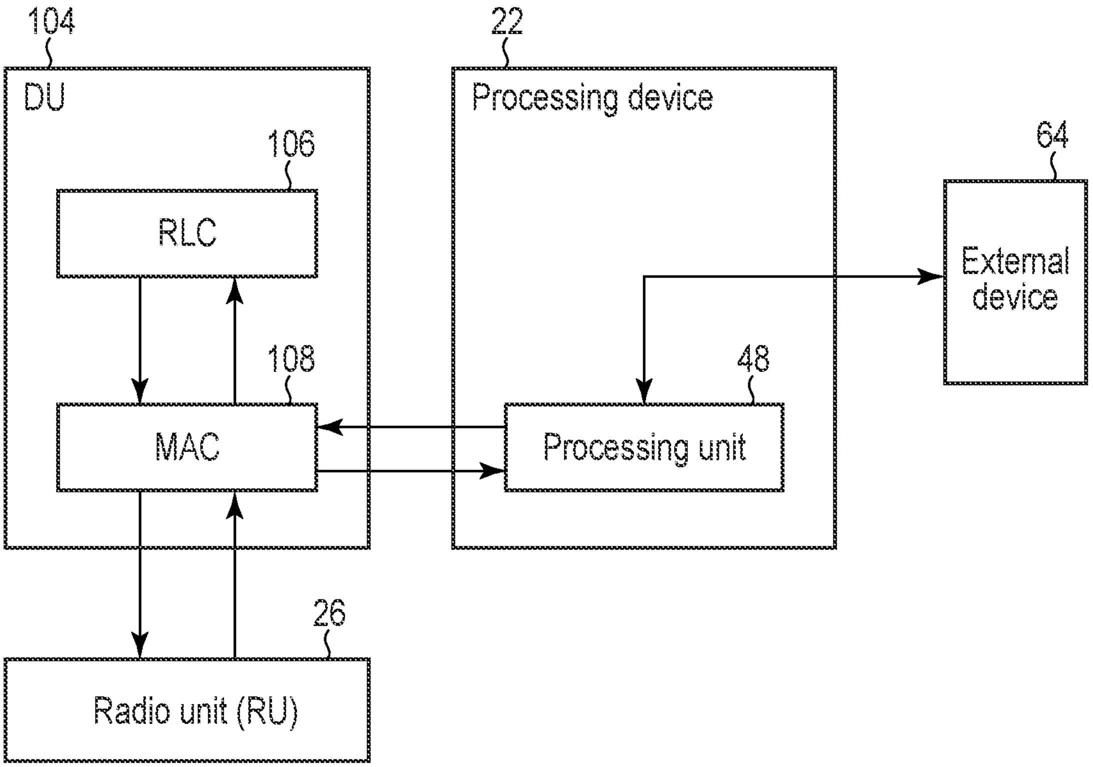
FIG. 24 is a diagram for explaining an implementation example of a processing unit 48 according to an eleventh embodiment.

FIG. 24 is a diagram for explaining an implementation example of a processing device 22 according to an eleventh embodiment. The processing device 22 is located in parallel with the DU 104. The processing unit 48 directly cooperates with the DU 104.

Since the processing unit 48 directly cooperates with the DU 104, the processing unit 48 is possible to receive data acquired by the DU 104 and directly issue an instruction to the DU 104.

An example of data acquired by the DU 104 and transmitted to the processing unit 48 is {rnti: "0123", frame: X, slot: Y, data_type: UP, data_size: 300, BSR: 1500}.

The processing unit 48 determines a transmission cycle based on the received data, and transmits an instruction related to an allocation request to the DU 104 at a timing corresponding to the determined timing. An example of the instruction is {rnti: "0123", status: "start"}.

The components of the processing device 22 other than the processing unit 48, that is, the functions of the receiver unit 46, the generation unit 50, and the transmitter unit 52, are implemented by the MAC layer 108. According to the allocation request instruction, the allocation unit in the MAC layer allocates communication resources and transmits allocation information to the terminal 16 via the radio unit (RU) 26. The allocation unit may be included in the processing unit 48 or any of the processing units 48*a* to 48*f*.

Although not illustrated, the processing device 22 may be disposed in parallel with the CU 102.

Twelfth Embodiment

The processing device 22 according to the above-described embodiments includes a plurality of functional units (generation unit 50, interpretation unit 54, determination unit 56, external cooperation unit 62, detection unit 76, detection unit 82, etc.) that implement a plurality of functions, respectively. However, the processing device 22 may include at least one functional unit that implements a plurality of functions.

The at least one functional unit may be constituted by one or more CPUs, FPGAs, and the like, or may be constituted by dedicated hardware. A program executed by one or more CPUs, FPGAs, and the like is stored in the memory included in the processing device 22.

According to the embodiments, following processing device, base station, communication system, communication method, and storage medium are provided.

(1) A processing device for a base station including a first layer and a second layer, the first layer and the second layer having different communication function, the processing device comprising:

- a receiver unit configured to receive first data from the first layer;
- a processing unit configured to generate second data based on the first data; and
- a transmitter unit configured to transmit the second data to the second layer, wherein
- the processing unit is configured to
  - determine a transmission cycle of the first data based on a timing at which the first data is received and a plurality of transmission cycle candidates, the transmission cycle of the first data being a cycle at which the first data is transmitted to the first layer, and
  - cause the transmitter unit to transmit the second data at a timing based on the transmission cycle of the first data.

(2) The processing device according to (1), wherein the second data comprises a signal for requesting allocation of communication resource.

(3) The processing device according to (1) or (2), wherein the processing unit is configured to generate, as the second data, data related to a scheduling request or an untransmitted data size, the scheduling request being defined in a communication protocol used in an interface between the first layer and the second layer.

(4) The processing device according to one of (1) to (3), wherein the processing unit is configured to generate the second data by inserting another data to the first data or by changing the first data.

(5) The processing device according one of (1) to (4), wherein the first layer comprises a PHY layer, and the second layer comprises a MAC layer.

(6) The processing device according to one of (1) to (5), wherein the transmitter unit periodically transmits user data to the second layer based on the transmission cycle of the first data.

(7) The processing device according to one of (1) to (6), wherein the processing unit is configured to receive the transmission cycle candidates from another device connected to the base station.

(8) The processing device according to one of (1) to (7), wherein the processing unit is configured to transmit the transmission cycle of the first data to the another device.

(9) The processing device according to one of (1) to (8), wherein the second layer is configured to generate third data based on the second data and transmit the third data to the processing unit, and the processing unit is configured to generate the second data at a timing based on the transmission cycle of the first data and a time period from transmission of the second data to the second layer to reception of the third data.

(10) The processing device according to one of (1) to (9), wherein the processing unit is configured to periodically transmit user data and an untransmitted data size to the second layer when periodically receiving a signal indicating that transmission of data is permitted from the second layer, and determine the transmission cycle of the first data based on the transmission cycle candidates and a timing of a first transmission of user data of two consecutive user data transmissions when an untransmitted data size remains unchanged or increases between the two consecutive transmissions of user data.

(11) The processing device according to one of (1) to (10), wherein the processing unit is configured to write, into a memory, information indicating a transmission cycle corresponding to a size of the first data, and determine a transmission cycle of data transmitted from the first layer based on the size of the first data and the information indicating the transmission cycle corresponding to the size of the first data.

(12) A base station comprising:

the processing device of one of (1) to (11);

a radio device configured to communicate with a radio communication terminal; and a communication device configured to communicate with a network.

(13) A communication system comprising:

a base station; and a server, wherein the base station comprises:

the processing device according to one of (1) to (11);

a radio device configured to communicate with a radio communication terminal; and a communication device configured to communicate with a network, and the server is connected to the network.

(14) A base station comprising:

a first unit configured to communicate with a radio communication terminal;

a second unit connected to the first unit and a network; and the processing unit according to one of (1) to (11), wherein the first unit comprises a first layer;

the second unit comprises a second layer and the processing unit; and the processing unit is connected to the second layer.

(15) A base station comprising:

a first unit configured to communicate with a radio communication terminal;

a second unit connected to the first unit and a network; and the processing unit according to one of (1) to (11), wherein the first unit comprises the first layer;

the second unit comprises the second layer; and the second layer comprises the processing unit.

(16) A base station comprising:

a first unit configured to communicate with a radio communication terminal;

a second unit connected to the first unit and a network; and the processing unit according to one of (1) to (11), wherein the first layer comprises the first layer and the processing unit;

the processing unit is connected to the first layer; and the second unit comprises the second layer.

(17) A base station comprising:

a first unit configured to communicate with a radio communication terminal;

a second unit connected to the first unit and a network; and the processing unit according to one of (1) to (11), wherein the first unit comprises the first layer and the processing unit;

the processing unit is connected to the first layer; and the second unit comprises the second layer.

(18) A base station comprising:

a first unit configured to communicate with a radio communication terminal;

a second unit connected to the first unit and a network; and the processing unit according to one of (1) to (11), wherein the first unit comprises the first layer;

the second unit comprises the second layer; and the processing unit is connected to the second layer.

(19) A communication method for a base station including a first layer and a second layer, the first layer and the second layer having different communication function, the communication method comprising:

receiving first data from the first layer;

detecting reception of the first data;

determining a transmission cycle of the first data based on a timing at which the first data is received and a plurality of transmission cycle candidates, the transmission cycle of the first data being a cycle at which the first data is transmitted to the first layer; and transmitting second data to the second layer at a timing based on the transmission cycle of the first data.

(20) A non-transitory computer-readable storage medium storing computer-executable instructions that, when executed, cause a computer to:

receive first data from a first layer in a base station, the station comprising the first layer and a second layer, the first layer and the second layer having different communication function;

detect reception of the first data;

determine a transmission cycle of the first data based on a timing at which the first data is received and a plurality of transmission cycle candidates, the transmission cycle of the first data being a cycle at which the first data is transmitted to the first layer; and transmit second data to the second layer at a timing based on the transmission cycle of the first data.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A processing device for a base station including a first layer and a second layer, the first layer and the second layer having different communication functions, and the processing device comprising:

a receiver configured to receive first data from the first layer;

a processing circuit configured to generate second data based on the first data; and a transmitter configured to transmit the second data to the second layer, wherein the processing circuit is configured to;

determine a transmission cycle of the first data based on a timing at which the first data is received and a first candidate in a plurality of transmission cycle candidates, the transmission cycle of the first data being a cycle at which the first data is transmitted to the first layer, cause the transmitter to transmit the second data at a timing based on the transmission cycle of the first data, and cause the transmitter to stop transmission of the second data at the timing based on the transmission cycle of the first data when the receiver does not receive the first data at a timing based on the transmission cycle of the first data.

2. The processing device of claim 1, wherein the second data comprises a signal for requesting allocation of a communication resource.

3. The processing device of claim 1, wherein the processing circuit is configured to generate, as the second data, data related to a scheduling request for a device which transmits the first data or a size of an untransmitted data which have not been transmitted by a device, the scheduling request being defined in a communication protocol used in an interface between the first layer and the second layer.

4. The processing device of claim 1, wherein the processing circuit is configured to generate the second data by inserting another data to the first data or by changing the first data.

5. The processing device of claim 1, wherein the first layer comprises a PHY layer, and the second layer comprises a MAC layer.

6. The processing device of claim 1, wherein the transmitter periodically transmits user data to the second layer based on the transmission cycle of the first data.

7. The processing device of claim 1, wherein the processing circuit is configured to receive the transmission cycle candidates from another device connected to the base station.

8. The processing device of claim 7, wherein the processing circuit is configured to transmit the transmission cycle of the first data to the another device.

9. The processing device of claim 1, wherein;

the second layer is configured to generate third data based on the second data and transmit the third data to the processing circuit, and the processing circuit is configured to generate the second data at a timing based on the transmission cycle of the first data and a time period from transmission of the second data to the second layer to reception of the third data.

10. The processing device of claim 1, wherein the processing circuit is configured to:

write, into a memory, information indicating a transmission cycle corresponding to a size of the first data, and determine a transmission cycle of data transmitted from the first layer based on the size of the first data and the information indicating the transmission cycle corresponding to the size of the first data.

11. A base station comprising:

the processing device of claim 1;

a radio device configured to communicate with a radio communication terminal; and a communication device configured to communicate with a network.

12. A communication system comprising:

a base station; and a server, wherein:

the base station comprises:

the processing device of claim 1;

a radio device configured to communicate with a radio communication terminal; and a communication device configured to communicate with a network, and the server is connected to the network.

13. A base station comprising:

a first device configured to communicate with a radio communication terminal;

a second device connected to the first device and a network; and the processing device of claim 1, wherein:

the first device comprises the first layer, the second device comprises the second layer and the processing circuit, and the processing circuit is connected to the second layer.

14. A base station comprising:

a first device configured to communicate with a radio communication terminal;

a second device connected to the first device and a network; and the processing device of claim 1, wherein:

the first device comprises the first layer, the second device comprises the second layer, and the second layer comprises the processing circuit.

15. A base station comprising:

a first device configured to communicate with a radio communication terminal;

a second device connected to the first device and a network; and the processing device of claim 1, wherein:

the first device comprises the first layer and the processing circuit, the processing circuit is connected to the first layer, and the second circuit comprises the second layer.

16. A base station comprising:

a first device configured to communicate with a radio communication terminal;

a second device connected to the first device and a network; and the processing device of claim 1, wherein:

the first device comprises the first layer, the first layer comprises the processing circuit, and the second circuit comprises the second layer.

17. A base station comprising:

a first device configured to communicate with a radio communication terminal;

a second device connected to the first device and a network; and the processing device of claim 1, wherein:

the first device comprises the first layer, the second device comprises the second layer, and the processing circuit is connected to the second layer.

18. A communication method for a base station including a first layer and a second layer, the first layer and the second layer having different communication functions, and the communication method comprising:

receiving first data from the first layer;

generating second data based on the first data;

transmitting the second data to the second layer;

receiving third data from the second layer, the third data being generated based on the second data;

determining a transmission cycle of the first data based on a timing at which the first data is received and a plurality of transmission cycle candidates, the transmission cycle of the first data being a cycle at which the first data is transmitted to the first layer;

transmitting the second data to the second layer at a timing based on the transmission cycle of the first data; and generating the second data at a timing based on the transmission cycle of the first data and a time period from transmission of the second data to the second layer to reception of the third data.

19. A non-transitory computer-readable storage medium storing computer-executable instructions that, when executed, cause a computer to:

receive first data from a first layer in a base station, the base station comprising the first layer and a second layer, and the first layer and the second layer having different communication functions;

generate second data based on the first data;

transmit the second data to the second layer;

receive third data from the second layer, the third data being generated based on the second data;

determine a transmission cycle of the first data based on a timing at which the first data is received and a plurality of transmission cycle candidates, the transmission cycle of the first data being a cycle at which the first data is transmitted to the first layer;

transmit the second data to the second layer at a timing based on the transmission cycle of the first data; and generate the second data at a timing based on the transmission cycle of the first data and a time period from transmission of the second data to the second layer to reception of the third data.

20. A processing device comprising:

a first receiver configured to receive first data from a first layer of a base station, the base station comprising the first layer and a second layer;

a processing circuit configured to generate second data based on the first data;

a transmitter configured to transmit the second data to the second layer; and a second receiver configured to receive third data from the second layer, the third data being generated based on the second data, wherein the processing circuit is configured to:

determine a transmission cycle of the first data based on a timing at which the first data is received and a plurality of transmission cycle candidates, the transmission cycle of the first data being a cycle at which the first data is transmitted to the first layer;

cause the transmitter to transmit the second data at a timing based on the transmission cycle of the first data; and generate the second data at a timing based on the transmission cycle of the first data and a time period from transmission of the second data to the second layer to reception of the third data.

21. The processing device of claim 20, wherein the processing circuit is configured to:

periodically transmit user data and an untransmitted data size to the second layer when periodically receiving a signal indicating that transmission of data is permitted from the second layer; and determine the transmission cycle of the first data based on the transmission cycle candidates and a timing of a first transmission of user data of two consecutive user data transmissions when an untransmitted data size remains unchanged or increases between the two consecutive transmissions of user data.

22. A processing device for a base station including a first layer and a second layer, the first layer and the second layer having different communication functions, and the processing device comprising:

a first receiver configured to receive first data from the first layer;

a processing circuit configured to generate second data based on the first data;

a transmitter configured to transmit the second data to the second layer; and a second receiver configured to receive third data from the second layer, the third data being generated based on the second data, wherein the processing circuit is configured to:

determine a transmission cycle of the first data based on a timing at which the first data is received and a plurality of transmission cycle candidates, the transmission cycle of the first data being a cycle at which the first data is transmitted to the first layer;

cause the transmitter to transmit the second data at a timing based on the transmission cycle of the first data;

cause the transmitter to periodically transmit the first data and an untransmitted data size to the second layer when the second receiver unit periodically receives a signal indicating that transmission of data is permitted from the second layer; and determine the transmission cycle of the first data based on the transmission cycle candidates and a timing of a first transmission of the first data of two consecutive first data transmissions when an untransmitted data size remains unchanged or increases between the two consecutive transmissions of the first data.

23. A processing device for a base station including a first layer and a second layer, the first layer and the second layer having different communication functions, and the processing device comprising:

a receiver configured to receive first data from the first layer;

a processing circuit configured to generate second data based on the first data; and a transmitter configured to transmit the second data to the second layer, wherein the processing circuit is configured to:

determine a transmission cycle of the first data based on a timing at which the first data is received and a first candidate in a plurality of transmission cycle candidates, the transmission cycle of the first data being a cycle at which the first data is transmitted to the first layer;

cause the transmitter to transmit the second data at a timing based on the transmission cycle of the first data; and change the transmission cycle of the first data based on a timing at which the first data is received and a second candidate in the plurality of transmission cycle candidates, the second candidate indicating a second cycle longer than a first cycle indicated by the first candidate when the receiver does not receive the first data at a timing based on the transmission cycle of the first data.

24. A processing device for a base station including a first layer and a second layer, the first layer and the second layer having different communication functions, and the processing device comprising:

a first receiver configured to receive, from the first layer, first data and a size of untransmitted data which have not been transmitted by a terminal connected to the first layer;

a processing circuit configured to generate second data based on the first data;

a transmitter configured to transmit the second data to the second layer; and a second receiver configured to receive a signal indicating that transmission of data is permitted from the second layer, wherein the processing circuit is configured to:

determine a transmission cycle of the first data based on a timing at which the first data is received and a plurality of transmission cycle candidates, the transmission cycle of the first data being a cycle at which the first data is transmitted to the first layer;

cause the transmitter to transmit the second data at a timing based on the transmission cycle of the first data;

cause the transmitter unit to periodically transmit the first data and the size of untransmitted data to the second layer when the second receiver unit periodically receives the signal indicating that transmission of data is permitted from the second layer;

determine a data-generation-estimated-period based on an interval between two consecutive user data transmissions when the size of untransmitted data remains unchanged or increases; and determine whether the first receiver receives the first data in a second data-generation-estimated-period starting from a given time period after a start of a first data-generation-estimated-period.

25. The processing device of claim 23, wherein the processing circuit is configured to set a third data-generation-estimated-period shorter than the second data-generation-estimated-period when the first receiver receives the first data in the second data-generation-estimated-period starting from the given time period after the start of the first data-generation-estimated-period.

* * * * *